US012634345B2

(12) United States Patent
Crabtree et al.

(10) Patent No.: US 12,634,345 B2
(45) Date of Patent: May 19, 2026

(54) HOLISTIC EXTERNAL NETWORK CYBERSECURITY EVALUATION AND SCORING

(71) Applicant: QOMPLX LLC, Reston, VA (US)

(72) Inventors: Jason Crabtree, Vienna, VA (US);
Richard Kelley, Woodbridge, VA (US)

(73) Assignee: QOMPLX LLC, Reston, VA (US)

( * ) Notice: Subject to any disclaimer, the term of this patent is extended or adjusted under 35 U.S.C. 154(b) by 249 days.

(21) Appl. No.: 17/986,850

(22) Filed: Nov. 14, 2022

(65) Prior Publication Data

US 2023/0171292 A1 Jun. 1, 2023

Related U.S. Application Data

(63) Continuation-in-part of application No. 17/567,060, filed on Dec. 31, 2021, which is a continuation-in-part of application No. 17/389,863, filed on Jul. 30, 2021, now Pat. No. 11,792,229, which is a continuation of application No. 16/792,754, filed on Feb. 17, 2020, now Pat. No. 11,184,401, which is a continuation-in-part of application No. 16/779,801, filed on Feb. 3, 2020, now Pat. No. 11,032,323, which is a continuation-in-part of application No. 16/777,270, (Continued)

(51) Int. Cl.
| | |
|---|---|
| *H04L 9/40* | (2022.01) |
| *G06F 16/2458* | (2019.01) |
| *G06F 16/951* | (2019.01) |
| *G06F 21/57* | (2013.01) |

(52) U.S. Cl.
CPC .......... *H04L 63/20* (2013.01); *G06F 16/2477* (2019.01); *G06F 16/951* (2019.01); *G06F 21/577* (2013.01); *H04L 63/1425* (2013.01); *H04L 63/1433* (2013.01); *H04L 63/1441* (2013.01); *G06F 2221/033* (2013.01); *G06F 2221/034* (2013.01); *H04L 63/1491* (2013.01)

(58) Field of Classification Search
CPC . H04L 63/20; H04L 63/1425; H04L 63/1433; H04L 63/1441; H04L 63/1491; G06F 16/2477; G06F 16/951; G06F 21/577; G06F 2221/033; G06F 2221/034
See application file for complete search history.

(56) References Cited

U.S. PATENT DOCUMENTS

| | | | |
|---|---|---|---|
| 6,256,544 | B1 | 7/2001 | Weissinger |
| 7,739,653 | B2 | 6/2010 | Venolia |

(Continued)

FOREIGN PATENT DOCUMENTS

| | | | |
|---|---|---|---|
| WO | 2014159150 | A1 | 10/2014 |
| WO | 2017075543 | A1 | 5/2017 |

*Primary Examiner* — Cheng-Feng Huang
(74) *Attorney, Agent, or Firm* — NK Patent Law

(57) ABSTRACT

A system and method for holistic network cybersecurity evaluation and risk rating that takes into account the operation of the entire target network environment comprising hardware, software, operating systems, and network connections. Not only are the hardware, software, operating system, and network evaluated separately for cybersecurity concerns, their interaction and operation as a whole are also evaluated and scored. The results of such analyses may be used, for example, by underwriters of cybersecurity insurance policies to determine policy terms and rates.

14 Claims, 19 Drawing Sheets

Related U.S. Application Data filed on Jan. 30, 2020, now Pat. No. 11,025,674, which is a continuation-in-part of application No. 16/720,383, filed on Dec. 19, 2019, now Pat. No. 10,944,795, which is a continuation of application No. 15/823,363, filed on Nov. 27, 2017, now Pat. No. 10,560,483, which is a continuation-in-part of application No. 15/725,274, filed on Oct. 4, 2017, now Pat. No. 10,609,079, which is a continuation-in-part of application No. 15/655,113, filed on Jul. 20, 2017, now Pat. No. 10,735,456, which is a continuation-in-part of application No. 15/616,427, filed on Jun. 7, 2017, now abandoned, which is a continuation-in-part of application No. 14/925,974, filed on Oct. 28, 2015, now abandoned, said application No. 15/655,113 is a continuation-in-part of application No. 15/237,625, filed on Aug. 15, 2016, now Pat. No. 10,248,910, which is a continuation-in-part of application No. 15/206,195, filed on Jul. 8, 2016, now abandoned, which is a continuation-in-part of application No. 15/186,453, filed on Jun. 18, 2016, now abandoned, which is a continuation-in-part of application No. 15/166,158, filed on May 26, 2016, now abandoned, which is a continuation-in-part of application No. 15/141,752, filed on Apr. 28, 2016, now Pat. No. 10,860,962, which is a continuation-in-part of application No. 15/091,563, filed on Apr. 5, 2016, now Pat. No. 10,204,147, and a continuation-in-part of application No. 14/986,536, filed on Dec. 31, 2015, now Pat. No. 10,210,255, and a continuation-in-part of application No. 14/925,974, filed on Oct. 28, 2015, now abandoned, said application No. 17/567,060 is a continuation-in-part of application No. 17/170,288, filed on Feb. 8, 2021, now Pat. No. 11,570,204, which is a continuation-in-part of application No. 17/169,924, filed on Feb. 8, 2021, now Pat. No. 11,570,209, which is a continuation-in-part of application No. 15/837,845, filed on Dec. 11, 2017, now Pat. No. 11,005,824, and a continuation-in-part of application No. 15/825,350, filed on Nov. 29, 2017, now Pat. No. 10,594,714, which is a continuation-in-part of application No. 15/725,274, filed on Oct. 4, 2017, now Pat. No. 10,609,079, said application No. 17/567,060 is a continuation-in-part of application No. 17/102,561, filed on Nov. 24, 2020, now abandoned, which is a continuation of application No. 15/790,457, filed on Oct. 23, 2017, now Pat. No. 10,884,999, which is a continuation-in-part of application No. 15/790,327, filed on Oct. 23, 2017, now Pat. No. 10,860,951, and a continuation-in-part of application No. 15/616,427, filed on Jun. 7, 2017, now abandoned, and a continuation-in-part of application No. 15/141,752, filed on Apr. 28, 2016, now Pat. No. 10,860,962, application No. 17/986,850 is a continuation-in-part of application No. 17/105,025, filed on Nov. 25, 2020, now Pat. No. 11,503,066, which is a continuation of application No. 16/836,717, filed on Mar. 31, 2020, now Pat. No. 10,917,428, which is a continuation-in-part of application No. 15/887,496, filed on Feb. 2, 2018, now Pat. No. 10,783,241, which is a continuation-in-part of application No. 15/823,285, filed on Nov. 27, 2017, now Pat. No. 10,740,096, which is a continuation-in-part of application No. 15/788,718, filed on Oct. 19, 2017, now Pat. No. 10,861,014, which is a continuation-in-part of application No. 15/788,002, filed on Oct. 19, 2017, now abandoned, which is a continuation-in-part of application No. 15/787,601, filed on Oct. 18, 2017, now Pat. No. 10,860,660, and a continuation-in-part of application No. 15/616,427, filed on Jun. 7, 2017, now abandoned, said application No. 15/887,496 is a continuation-in-part of application No. 15/818,733, filed on Nov. 20, 2017, now Pat. No. 10,673,887, which is a continuation-in-part of application No. 15/725,274, filed on Oct. 4, 2017, now Pat. No. 10,609,079.

(60) Provisional application No. 62/596,105, filed on Dec. 7, 2017, provisional application No. 62/568,291, filed on Oct. 4, 2017, provisional application No. 62/568,298, filed on Oct. 4, 2017, provisional application No. 62/568,312, filed on Oct. 4, 2017, provisional application No. 62/568,305, filed on Oct. 4, 2017, provisional application No. 62/568,307, filed on Oct. 4, 2017.

(56) References Cited

U.S. PATENT DOCUMENTS

| | | | | |
|---|---|---|---|---|
| 8,006,303 | B1 * | 8/2011 | Dennerline | H04L 63/1408 |
| | | | | 726/23 |
| 8,583,639 | B2 | 11/2013 | Chitnis et al. | |
| 8,595,240 | B1 * | 11/2013 | Otey | G06F 16/951 |
| | | | | 707/749 |
| 8,677,473 | B2 | 3/2014 | Dennerline et al. | |
| 8,725,597 | B2 | 5/2014 | Mauseth et al. | |
| 8,726,393 | B2 | 5/2014 | Macy et al. | |
| 9,141,360 | B1 | 9/2015 | Chen et al. | |
| 9,210,185 | B1 * | 12/2015 | Pinney Wood | H04L 63/1433 |
| 9,288,223 | B2 * | 3/2016 | Sharabani | H04L 63/1491 |
| 9,319,430 | B2 | 4/2016 | Bell, Jr. et al. | |
| 9,426,169 | B2 * | 8/2016 | Zandani | G06F 21/57 |
| 9,602,530 | B2 | 3/2017 | Ellis et al. | |
| 9,672,355 | B2 | 6/2017 | Titonis et al. | |
| 9,712,553 | B2 | 7/2017 | Nguyen et al. | |
| 10,061,635 | B2 | 8/2018 | Ellwein | |
| 10,248,910 | B2 | 4/2019 | Crabtree et al. | |
| 10,320,828 | B1 * | 6/2019 | Derbeko | G06F 21/577 |
| 10,367,829 | B2 | 7/2019 | Huang et al. | |
| 2005/0289072 | A1 | 12/2005 | Sabharwal | |
| 2008/0270203 | A1 * | 10/2008 | Holmes | G06Q 30/0201 |
| | | | | 705/7.29 |
| 2008/0270209 | A1 * | 10/2008 | Mauseth | G06Q 30/0201 |
| | | | | 705/7.29 |
| 2009/0210419 | A1 * | 8/2009 | Chitnis | G06F 16/951 |
| 2009/0320137 | A1 * | 12/2009 | White | H04L 63/1433 |
| | | | | 707/999.102 |
| 2010/0125900 | A1 * | 5/2010 | Dennerline | H04L 63/0227 |
| | | | | 726/13 |
| 2011/0004566 | A1 * | 1/2011 | Berkowitz | G06F 9/3004 |
| | | | | 703/23 |
| 2013/0019314 | A1 * | 1/2013 | Ji | H04L 63/168 |
| | | | | 726/25 |
| 2013/0097706 | A1 | 4/2013 | Titonis et al. | |
| 2013/0227697 | A1 * | 8/2013 | Zandani | G06F 21/57 |
| | | | | 726/25 |
| 2013/0283336 | A1 * | 10/2013 | Macy | G06F 21/40 |
| | | | | 726/1 |
| 2013/0318614 | A1 * | 11/2013 | Archer | G06F 21/577 |
| | | | | 726/25 |
| 2014/0173738 | A1 * | 6/2014 | Condry | G06F 21/577 |
| | | | | 726/25 |
| 2015/0106889 | A1 * | 4/2015 | Sharabani | G06F 16/95 |
| | | | | 726/5 |
| 2015/0237068 | A1 * | 8/2015 | Sandke | H04L 63/1425 |
| | | | | 726/23 |
| 2015/0365437 | A1 * | 12/2015 | Bell, Jr. | G06F 21/54 |
| | | | | 726/1 |
| 2016/0004858 | A1 | 1/2016 | Chen et al. | |

(56)  References Cited

U.S. PATENT DOCUMENTS

| | | | |
|---|---|---|---|
| 2016/0057166 A1* | 2/2016 | Chesla | H04L 63/1416 |
| | | | 726/22 |
| 2016/0099960 A1 | 4/2016 | Gerritz et al. | |
| 2016/0117498 A1* | 4/2016 | Saxena | G06F 21/445 |
| | | | 726/26 |
| 2016/0149930 A1* | 5/2016 | Casaburi | H04L 63/1425 |
| | | | 726/1 |
| 2016/0196368 A1* | 7/2016 | Momot | G06F 30/20 |
| | | | 703/22 |
| 2016/0275123 A1 | 9/2016 | Lin et al. | |
| 2016/0285907 A1* | 9/2016 | Nguyen | H04L 63/1433 |
| 2017/0235961 A1* | 8/2017 | August | H04L 9/3242 |
| | | | 713/189 |

* cited by examiner

510 Translate target file into binary

520 Transfer translated file to sandbox environment

530 Execute file in sandbox environment

540 Examine executing software for irregularities

550 Probe for known or expected vulnerabilities

560 Learn new behaviors based on analysis of software

710 Vulnerabilities and exploits located in executed software are relayed to scoring engine 720 Vulnerabilities and exploits are scored based on perceived criticality 730 Most critical vulnerabilities and exploits are schedule to be patched first

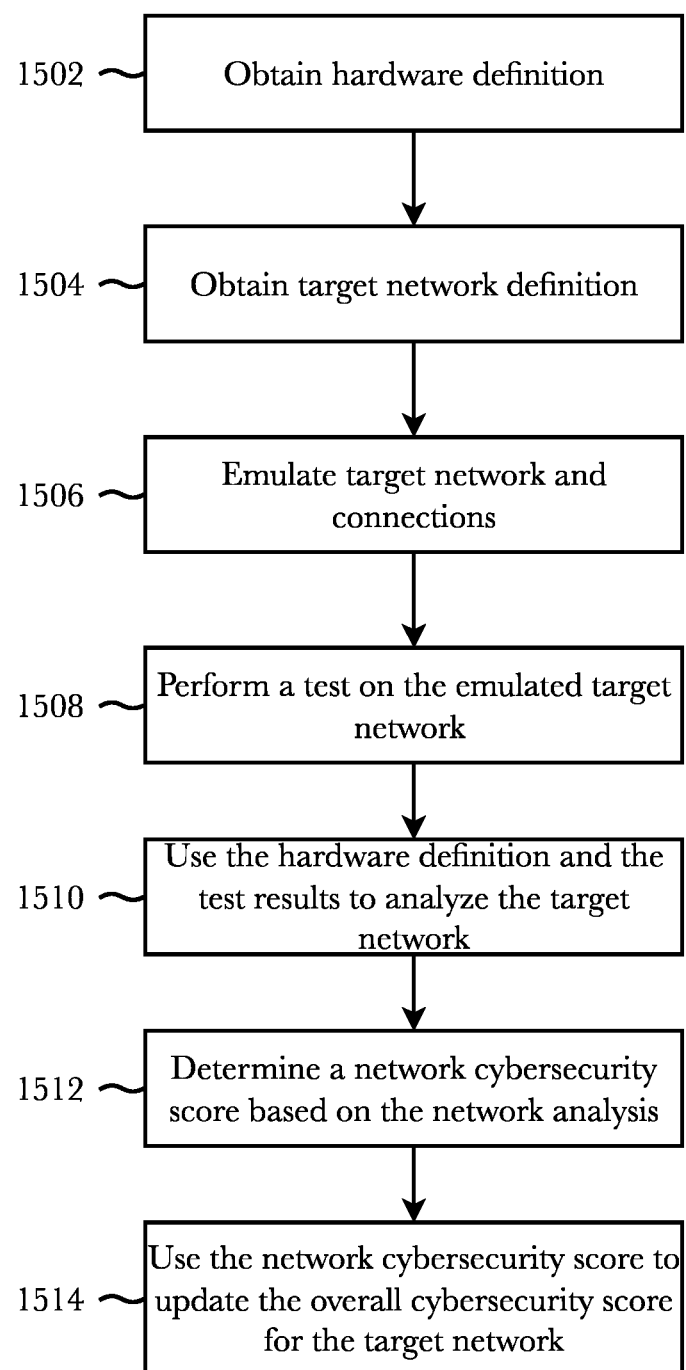

1502 — Obtain hardware definition

1504 — Obtain target network definition

1506 — Emulate target network and connections

1508 — Perform a test on the emulated target network

1510 — Use the hardware definition and the test results to analyze the target network 1512 — Determine a network cybersecurity score based on the network analysis 1514 — Use the network cybersecurity score to update the overall cybersecurity score for the target network

Fig. 15

HOLISTIC EXTERNAL NETWORK CYBERSECURITY EVALUATION AND SCORING

CROSS-REFERENCE TO RELATED APPLICATIONS

Priority is claimed in the application data sheet to the following patents or patent applications, the entire written description of each of which is expressly incorporated herein by reference in its entirety:
Ser. No. 17/567,060
Ser. No. 17/389,863
Ser. No. 16/792,754
Ser. No. 16/779,801
Ser. No. 16/777,270
Ser. No. 16/720,383
Ser. No. 15/823,363
Ser. No. 15/725,274
Ser. No. 15/655,113
Ser. No. 15/616,427
Ser. No. 14/925,974
Ser. No. 15/237,625
Ser. No. 15/206,195
Ser. No. 15/186,453
Ser. No. 15/166,158
Ser. No. 15/141,752
Ser. No. 15/091,563
Ser. No. 14/986,536
Ser. No. 14/925,974
Ser. No. 17/170,288
Ser. No. 17/169,924
Ser. No. 15/837,845
62/596,105
Ser. No. 15/825,350
Ser. No. 15/725,274
Ser. No. 17/102,561
Ser. No. 15/790,457
Ser. No. 15/790,327
62/568,291
Ser. No. 15/616,427
Ser. No. 15/141,752
62/568,298
Ser. No. 17/105,025
Ser. No. 16/836,717
Ser. No. 15/887,496
Ser. No. 15/823,285
Ser. No. 15/788,718
Ser. No. 15/788,002
Ser. No. 15/787,601
62/568,312
Ser. No. 15/616,427
62/568,305
62/568,307
Ser. No. 15/818,733

BACKGROUND OF THE INVENTION

Field of the Art

The disclosure relates to the field of computer systems, and more particularly to the field of cybersecurity and threat analytics.

Discussion of the State of the Art

In the field of product liability underwriting, there has existed for over 125 years a product safety testing institute called the Underwriters Laboratories. The original purpose of the Underwriters Laboratories was to test and certify electrical appliances for fire safety purposes, so that fire insurance underwriters had reliable information on which to base their fire insurance policy terms. The scope of the UL has expanded to include other types of mechanical and electrical appliances, and many other testing companies exist that perform a similar function for mechanical and electrical appliances. However, there is currently no similar standard for testing, certifying, and/or rating computer systems for cybersecurity purposes.

What is needed is a system and method for holistic computer system cybersecurity evaluation and rating that takes into account the operation of the entire computer system environment comprising hardware, software, and the operating system.

SUMMARY OF THE INVENTION

Accordingly, the inventor has conceived and reduced to practice, a system and method for holistic network cybersecurity evaluation and risk rating that takes into account the operation of the entire target network environment comprising hardware, software, operating systems, and network connections. Not only are the hardware, software, operating system, and network evaluated separately for cybersecurity concerns, their interaction and operation as a whole are also evaluated and scored. The results of such analyses may be used, for example, by underwriters of cybersecurity insurance policies to determine policy terms and rates.

According to a preferred embodiment, a system for holistic network cybersecurity evaluation and rating is disclosed, comprising: a first computing device comprising a memory and a processor; the hardware emulator comprising a first plurality of programming instructions stored in the memory of, and operating on the processor of, the first computing device, wherein the first plurality of programming instructions, when operating on the processor, cause the first computing device to: emulate functioning of a second computing device on the first computing device by: executing a set of functions that emulate the operation of the second computing device as defined by a hardware definition; receiving and installing an operating system on the emulated second computing device; receiving and installing an application on the emulated second computing device; and executing the application on the emulated second computing device using the operating system; and analyze the functioning of the second computing device by executing an attack on the emulated second computing device associated with a known hardware exploit to: determine whether the emulated second computing device is susceptible to the known hardware exploit; and update a hardware cybersecurity score using the determination; and send the updated hardware cybersecurity score to a scoring engine; and the scoring engine comprising a second plurality of programming instructions stored in the memory of, and operating on the processor of, the first computing device, wherein the second plurality of programming instructions, when operating on the processor, cause the first computing device to: generate a cybersecurity score for the second computing device based on a combination of a software cybersecurity score, a hardware cybersecurity score, and an operating system cybersecurity score; and update the cybersecurity score with an updated hardware cybersecurity score from a hardware emulator.

According to another preferred embodiment, a method for holistic network cybersecurity evaluation and rating is disclosed, comprising the steps of: emulating functioning of a second computing device on a first computing device by: executing a set of functions that emulate the operation of the second computing device as defined by a hardware definition; receiving and installing an operating system on the emulated second computing device; receiving and installing an application on the emulated second computing device; and executing the application on the emulated second computing device using the operating system; and analyzing the functioning of the second computing device by executing an attack on the emulated second computing device associated with a known hardware exploit to: determine whether the emulated second computing device is susceptible to the exploit; and update a hardware cybersecurity score using the determination; generating a cybersecurity score for the second computing device based on a combination of a software cybersecurity score, a hardware cybersecurity score, and an operating system cybersecurity score; and updating the cybersecurity score using the updated hardware cybersecurity score.

According to an aspect of an embodiment, the software definition comprises source code for an application and the software cybersecurity score further comprises an analysis of the coding complexity of the source code.

According to an aspect of an embodiment, a system analyzer comprising a third plurality of programming instructions stored in the memory of, and operating on the processor of, the first computing device, wherein the third plurality of programming instructions, when operating on the processor, causes the first computing device to: receive a system definition comprising: a software definition comprising executable binary code for an application; the hardware definition comprising a specification for the second computing device; and an operating system definition for the second computing device, the operating system definition comprising executable binary code for an operating system; identify a software function defined by the software definition and compare the function to a database of software functions to establish the software cybersecurity score; identify a hardware component defined by the hardware definition and compare the component to a database of components to establish the hardware cybersecurity score; and identify an operating system function defined by the operating system definition and compare the function to a database of operating system functions to establish the operating system cybersecurity score.

According to an aspect of an embodiment, a reconnaissance engine comprising a fourth plurality of programming instructions stored in the memory of, and operating on the processor of, the first computing device, wherein the fourth plurality of programming instructions, when operating on the processor, causes the first computing device to: capture system information and characteristics about a target network; use the captured system information and characteristics to create a network definition, the network definition being in the form of a graph representation of the target network, wherein the nodes of the graph represent hardware or computing devices, and the edges between nodes represent physical and logical connections between and among the hardware or computing devices; and send the network definition to the hardware emulator.

According to an aspect of an embodiment, the hardware emulator is further configured to: receive the network definition; emulate functioning of a target network on the first computing device by: executing a set of functions that emulate the operation of the target network as defined by the hardware definitions and the network definition; analyze the functioning of the target network by executing an attack on the emulated target network associated with a known hardware exploit to: determine whether the emulated target network is susceptible to the known hardware exploit; and update a network cybersecurity score using the determination; and send the updated network cybersecurity score to a scoring engine; and wherein the scoring engine is further configured to: generate a cybersecurity score for the target network based on a combination of the software cybersecurity score, the hardware cybersecurity score, the operating system cybersecurity score, and the network cybersecurity score; and update the cybersecurity score with an updated network cybersecurity score from the hardware emulator.

According to an aspect of an embodiment, the hardware definition comprises at least one or more memory maps, wherein the one or more memory maps associate hardware components of a physical hardware system and memory locations of the emulated second computing device.

According to an aspect of an embodiment, the first computing device is a cloud-based computing device external to a target network.

According to an aspect of an embodiment, a set of clones of the emulated second computing device are created and tools are injected in each clone for testing.

According to an aspect of an embodiment, a set of clones of the emulated target network are created and tools are injected into each clone for testing.

BRIEF DESCRIPTION OF THE DRAWING FIGURES

The accompanying drawings illustrate several aspects and, together with the description, serve to explain the principles of the invention according to the aspects. It will be appreciated by one skilled in the art that the particular arrangements illustrated in the drawings are merely exemplary, and are not to be considered as limiting of the scope of the invention or the claims herein in any way.

FIG. 15 is a flow diagram illustrating an exemplary method for emulating, testing, and scoring a target network using a cloud-based test host.

DETAILED DESCRIPTION

Figure 1:
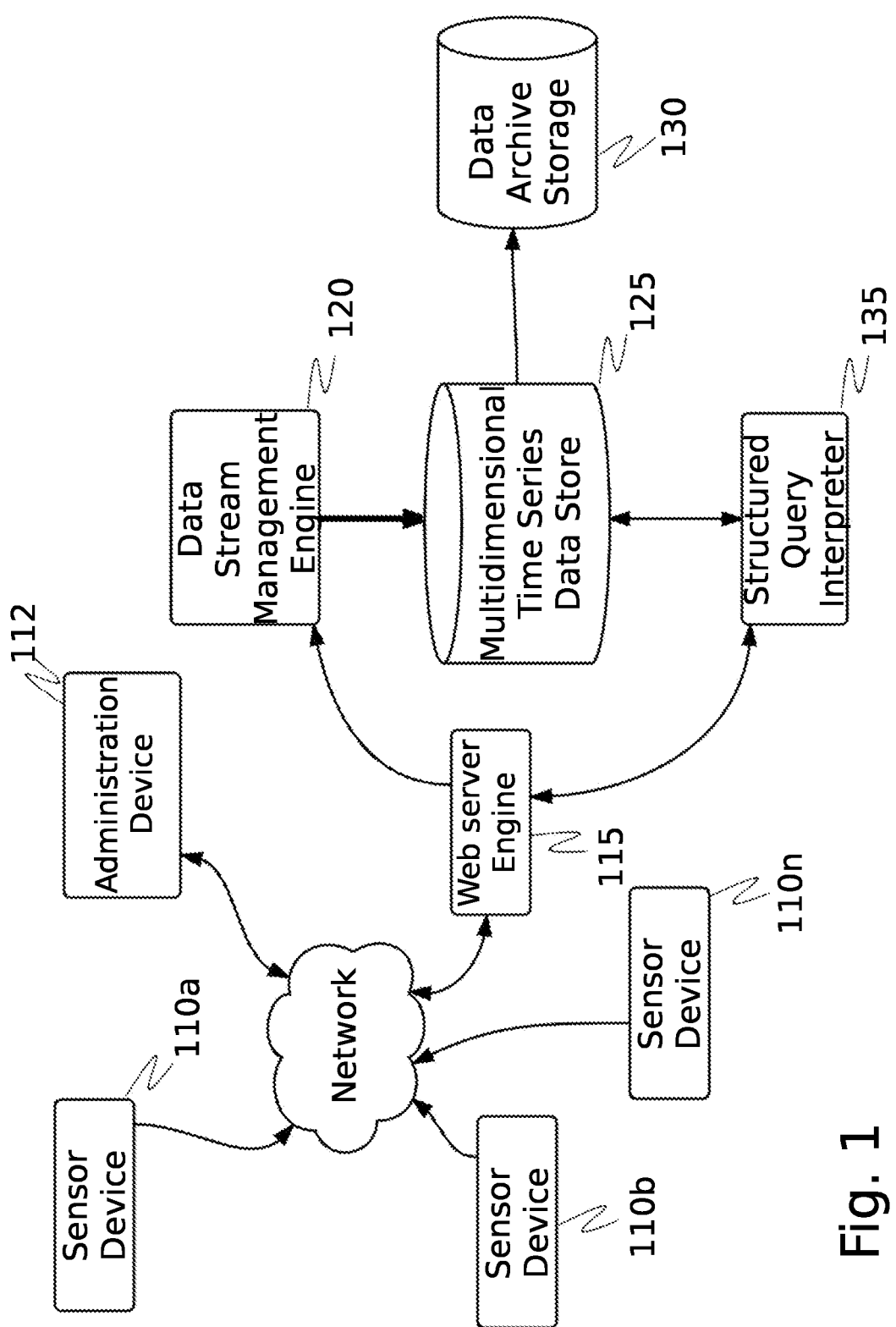
FIG. 1 is a diagram of an exemplary architecture of a system for the capture and storage of time series data from sensors with heterogeneous reporting profiles according to a preferred aspect of the invention.

The inventor has conceived, and reduced to practice, a system and method for holistic network cybersecurity evaluation and risk rating that takes into account the operation of the entire target network environment comprising hardware, software, operating systems, and network connections. Not only are the hardware, software, operating system, and network evaluated separately for cybersecurity concerns, their interaction and operation as a whole are also evaluated and scored. The results of such analyses may be used, for example, by underwriters of cybersecurity insurance policies to determine policy terms and rates.

Insurance underwriters needs accurate risk information in order to properly establish policy terms and set rates. For most insurance fields, there reliable data exists for underwriters to use in making such decisions. In the field of life insurance, for example, very reliable and accurate data exist regarding life expectancies based on an individual's age and health profile. For fire insurance, reliable and accurate data exist regarding fire frequency, severity, and the value of property damaged. In the field of product liability insurance, a testing industry has existed for decades to test mechanical and electrical appliances, and rate or certify them according to various criteria, precisely for the purpose of providing data regarding the safety of those items. As mentioned above, Underwriters Laboratory has been in existence for 125 years, and was originally formed to provide fire insurance underwriters with reliable data regarding electrical appliances.

Despite having such testing available in other industries, no testing, certifying, and/or rating exists for computer systems for cybersecurity purposes. Computers have become ubiquitous in both personal and business use, and the potential for economic, privacy, and other harms due to cybersecurity attacks is tremendous. Insurance underwriters have begun offering cybersecurity insurance policies in recent years. Yet, while there are general data regarding the number and types of cybersecurity attacks, and related losses in the case of successful attacks, there is no standard system or method for establishing, rating, or scoring the security of computer systems as a whole. Insurers need such data to adequately establish policy terms and set rates. There is also the possibility that computer hardware manufacturers, software developers, and operating system developers could be held liable for failure to adequately design and/or build their products with sufficient cybersecurity protections. In the event that product liability evolves in that direction, product liability insurance underwriters will need accurate and reliable data on which to base their policies.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring nonsimultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Definitions

As used herein, a "swimlane" is a communication channel between a time series sensor data reception and apportioning device and a data store meant to hold the apportioned data time series sensor data. A swimlane is able to move a specific, finite amount of data between the two devices. For example, a single swimlane might reliably carry and have incorporated into the data store, the data equivalent of 5 seconds worth of data from 10 sensors in 5 seconds, this being its capacity. Attempts to place 5 seconds worth of data received from 6 sensors using one swimlane would result in data loss.

As used herein, a "metaswimlane" is an as-needed logical combination of transfer capacity of two or more real swimlanes that is transparent to the requesting process. Sensor studies where the amount of data received per unit time is expected to be highly heterogeneous over time may be initiated to use metaswimlanes. Using the example used above that a single real swimlane can transfer and incorporate the 5 seconds worth of data of 10 sensors without data loss, the sudden receipt of incoming sensor data from 13 sensors during a 5 second interval would cause the system to create a two swimlane metaswimlane to accommodate the standard 10 sensors of data in one real swimlane and the 3 sensor data overage in the second, transparently added real swimlane, however no changes to the data receipt logic would be needed as the data reception and apportionment device would add the additional real swimlane transparently.

Conceptual Architecture

FIG. 1 is a diagram of an exemplary architecture of a system for the capture and storage of time series data from sensors with heterogeneous reporting profiles according to a preferred aspect of the invention 100. In this embodiment, a plurality of sensor devices 110*a-n* stream data to a collection device, in this case a web server acting as a network gateway 115. These sensors 110*a-n* can be of several forms, some non-exhaustive examples being: physical sensors measuring humidity, pressure, temperature, orientation, and presence of a gas; or virtual such as programming measuring a level of network traffic, memory usage in a controller, and number of times the word "refill" is used in a stream of email messages on a particular network segment, to name a small few of the many diverse forms known to the art. In the embodiment, the sensor data is passed without transformation to the data management engine 120, where it is aggregated and organized for storage in a specific type of data store 125 designed to handle the multidimensional time series data resultant from sensor data. Raw sensor data can exhibit highly different delivery characteristics. Some sensor sets may deliver low to moderate volumes of data continuously. It would be infeasible to attempt to store the data in this continuous fashion to a data store as attempting to assign identifying keys and store real time data from multiple sensors would invariably lead to significant data loss. In this circumstance, the data stream management engine 120 would hold incoming data in memory, keeping only the parameters, or "dimensions" from within the larger sensor stream that are predecided by the administrator of the study as important and instructions to store them transmitted from the administration device 112. The data stream management engine 120 would then aggregate the data from multiple individual sensors and apportion that data at a predetermined interval, for example, every 10 seconds, using the timestamp as the key when storing the data to a multidimensional time series data store over a single swimlane of sufficient size. This highly ordered delivery of a foreseeable amount of data per unit time is particularly amenable to data capture and storage but patterns where delivery of data from sensors occurs irregularly and the amount of data is extremely heterogeneous are quite prevalent. In these situations, the data stream management engine cannot successfully use strictly single time interval over a single swimlane mode of data storage. In addition to the single time interval method the invention also can make use of event based storage triggers where a predetermined number of data receipt events, as set at the administration device 112, triggers transfer of a data block consisting of the apportioned number of events as one dimension and a number of sensor ids as the other. In the embodiment, the system time at commitment or a time stamp that is part of the sensor data received is used as the key for the data block value of the value-key pair. The invention can also accept a raw data stream with commitment occurring when the accumulated stream data reaches a predesigned size set at the administration device 112.

It is also likely that that during times of heavy reporting from a moderate to large array of sensors, the instantaneous load of data to be committed will exceed what can be reliably transferred over a single swimlane. The embodiment of the invention can, if capture parameters pre-set at the administration device 112, combine the data movement capacity of two or more swimlanes, the combined bandwidth dubbed a metaswimlane, transparently to the committing process, to accommodate the influx of data in need of commitment. All sensor data, regardless of delivery circumstances are stored in a multidimensional time series data store 125 which is designed for very low overhead and rapid data storage and minimal maintenance needs to sap resources. The embodiment uses a key-value pair data store examples of which are Riak, Redis and Berkeley DB for their low overhead and speed, although the invention is not specifically tied to a single data store type to the exclusion of others known in the art should another data store with better response and feature characteristics emerge. Due to factors easily surmised by those knowledgeable in the art, data store commitment reliability is dependent on data store data size under the conditions intrinsic to time series sensor data analysis. The number of data records must be kept relatively low for the herein disclosed purpose. As an example, one group of developers restrict the size of their multidimensional time series key-value pair data store to approximately $8.64\times10^4$ records, equivalent to 24 hours of 1 second interval sensor readings or 60 days of 1 minute interval readings. In this development system the oldest data is deleted from the data store and lost. This loss of data is acceptable under development conditions but in a production environment, the loss of the older data is almost always significant and unacceptable. The invention accounts for this need to retain older data by stipulating that aged data be placed in long term storage. In the embodiment, the archival storage is included 130. This archival storage might be locally provided by the user, might be cloud based such as that offered by Amazon Web Services or Google or could be any other available very large capacity storage method known to those skilled in the art.

Reliably capturing and storing sensor data as well as providing for longer term, offline, storage of the data, while important, is only an exercise without methods to repetitively retrieve and analyze most likely differing but specific sets of data over time. The invention provides for this requirement with a robust query language that both provides straightforward language to retrieve data sets bounded by multiple parameters, but to then invoke several transformations on that data set prior to output. In the embodiment isolation of desired data sets and transformations applied to that data occurs using pre-defined query commands issued from the administration device 112 and acted upon within the database by the structured query interpreter 135. Below is a highly simplified example statement to illustrate the method by which a very small number of options that are available using the structured query interpreter 135 might be accessed.

SELECT [STREAMING|EVENTS] data_spec FROM [unit] timestamp TO timestamp GROUPBY (sensor_id, identifier) FILTER [filter_identifier] FORMAT [sensor [AS identifier] [, sensor [AS identifier]] . . . ] (TEXT|JSON|FUNNEL|KML|GEOJSON|TOPOJSON);

Here "data_spec" might be replaced by a list of individual sensors from a larger array of sensors and each sensor in the list might be given a human readable identifier in the format "sensor AS identifier". "unit" allows the researcher to assign a periodicity for the sensor data such as second (s), minute (m), hour (h). One or more transformational filters, which include but a not limited to: mean, median, variance, standard deviation, standard linear interpolation, or Kalman filtering and smoothing, may be applied and then data formatted in one or more formats examples of with are text, JSON, KML, GEOJSON and TOPOJSON among others known to the art, depending on the intended use of the data.

Figure 2:
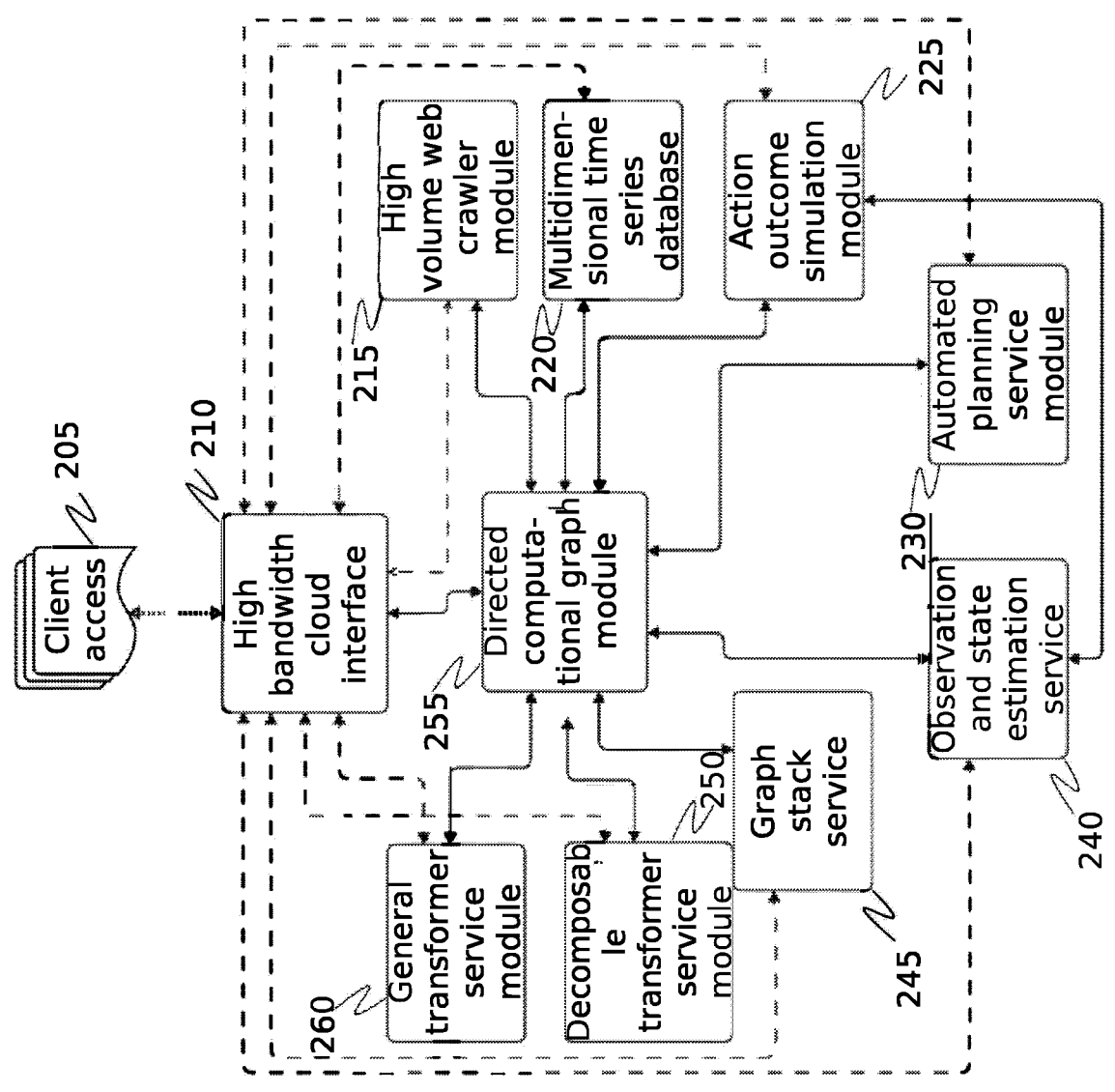
FIG. 2 is a diagram of an exemplary architecture of a business operating system according to a preferred aspect of the invention.

FIG. 2 is a diagram of an exemplary architecture of a business operating system 200 according to a preferred aspect. Client access to the system 205 both for system control and for interaction with system output such as automated predictive decision making and planning and alternate pathway simulations, occurs through the system's highly distributed, very high bandwidth cloud interface 210 which is application driven through the use of the Scala/Lift development environment and web interaction operation mediated by AWS ELASTIC BEANSTALK™, both used for standards compliance and ease of development. Much of the business data analyzed by the system both from sources within the confines of the client business, and from cloud based sources, also enter the system through the cloud interface 210, data being passed to the analysis and transformation components of the system, the directed computational graph module 255, high volume web crawling module 215 and multidimensional time series database 220. The directed computational graph retrieves one or more streams of data from a plurality of sources, which includes, but is in no way not limited to, a number of physical sensors, web based questionnaires and surveys, monitoring of electronic infrastructure, crowd sourcing campaigns, and human input device information. Within the directed computational graph, data may be split into two identical streams, wherein one sub-stream may be sent for batch processing and storage while the other sub-stream may be reformatted for transformation pipeline analysis. The data is then transferred to general transformer service 260 for linear data transformation as part of analysis or decomposable transformer service 250 for branching or iterative transformations that are part of analysis. The directed computational graph 255 represents all data as directed graphs where the transformations are nodes and the result messages between transformations edges of the graph. These graphs which contain considerable intermediate transformation data are stored and further analyzed within graph stack module 245. High volume web crawling module 215 uses multiple server hosted preprogrammed web spiders to find and retrieve data of interest from web based sources that are not well tagged by conventional web crawling technology. Multiple dimension time series database module 220 receives data from a large plurality of sensors that may be of several different types. The module is designed to accommodate irregular and high volume surges by dynamically allotting network bandwidth and server processing channels to process the incoming data. Data retrieved by the multidimensional time series database 220 and the high volume web crawling module 215 may be further analyzed and transformed into task optimized results by the directed computational graph 255 and associated general transformer service 250 and decomposable transformer service 260 modules.

Results of the transformative analysis process may then be combined with further client directives, additional business rules and practices relevant to the analysis and situational information external to the already available data in the automated planning service module 230 which also runs powerful predictive statistics functions and machine learning algorithms to allow future trends and outcomes to be rapidly forecast based upon the current system derived results and choosing each a plurality of possible business decisions. Using all available data, the automated planning service module 230 may propose business decisions most likely to result is the most favorable business outcome with a usably high level of certainty. Closely related to the automated planning service module in the use of system derived results in conjunction with possible externally supplied additional information in the assistance of end user business decision making, the business outcome simulation module 225 coupled with the end user facing observation and state estimation service 240 allows business decision makers to investigate the probable outcomes of choosing one pending course of action over another based upon analysis of the current available data. For example, the pipelines operations department has reported a very small reduction in crude oil pressure in a section of pipeline in a highly remote section of territory. Many believe the issue is entirely due to a fouled, possibly failing flow sensor, others believe that it is a proximal upstream pump that may have foreign material stuck in it. Correction of both of these possibilities is to increase the output of the effected pump to hopefully clean out it or the fouled sensor. A failing sensor will have to be replaced at the next maintenance cycle. A few, however, feel that the pressure drop is due to a break in the pipeline, probably small at this point, but even so, crude oil is leaking and the remedy for the fouled sensor or pump option could make the leak much worse and waste much time afterwards. The company does have a contractor about 8 hours away, or could rent satellite time to look but both of those are expensive for a probable sensor issue, significantly less than cleaning up an oil spill though and then with significant negative public exposure. These sensor issues have happened before and the business operating system 200 has data from them, which no one really studied due to the great volume of columnar figures, so the alternative courses 225, 240 of action are run. The system, based on all available data predicts that the fouled sensor or pump are unlikely the root cause this time due to other available data and the contractor is dispatched. She finds a small breach in the pipeline. There will be a small cleanup and the pipeline needs to be shut down for repair but multiple tens of millions of dollars have been saved. This is just one example of a great many of the possible use of the business operating system, those knowledgeable in the art will easily formulate more.

Figure 3:
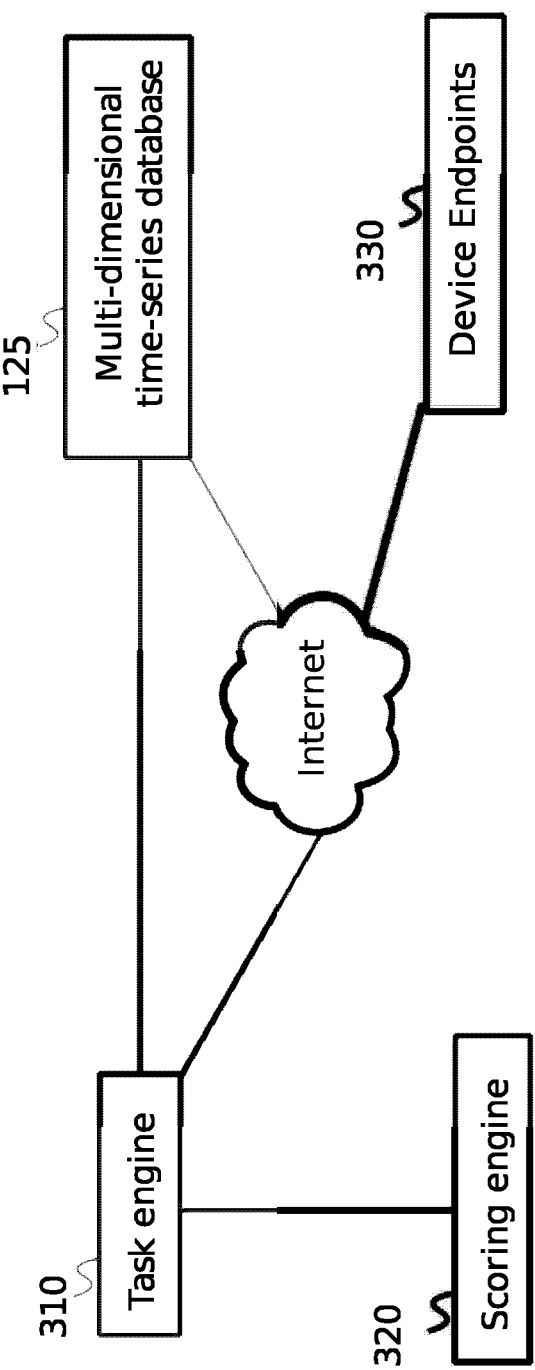
FIG. 3 is a diagram of an exemplary architecture of a cybersecurity analysis system according to a preferred aspect of the invention.

FIG. 3 is a system diagram, illustrating the connections between crucial components, according to an aspect of the invention. Core components include a scheduling task engine 310 which will run any processes and continue with any steps desired by the client, as described in further methods and diagrams in the disclosure. Tasks may be scheduled to run at specific times, or run for certain given amounts of time, which is commonplace for task scheduling software and systems in the art. This task engine 310 is then connected to the internet, and possibly to a single or plurality of local Multi-Dimensional Time-Series Databases (MDTSDB) 125. It is also possible to be connected to remotely hosted and controlled MDTSDB's 125 through the Internet, the physical location or proximity of the MDTSDB for this disclosure not being a limiting factor. In such cases as the MDTSDB 125 is not hosted locally, it must also maintain a connection to the Internet or another form of network for communication with the task engine 310. Device endpoints 330, especially Internet-of-Things (IoT) devices, are also by definition connected to the internet, and in methods described in later figures will be used for cybersecurity analysis and risk assessment. The task engine 310 which will perform the scheduling and running of the methods described herein also maintains a connection to the scoring engine 320, which will be used to evaluate data gathered from the analysis and reconnaissance tasks run by the task scheduling engine 310.

Figure 4:
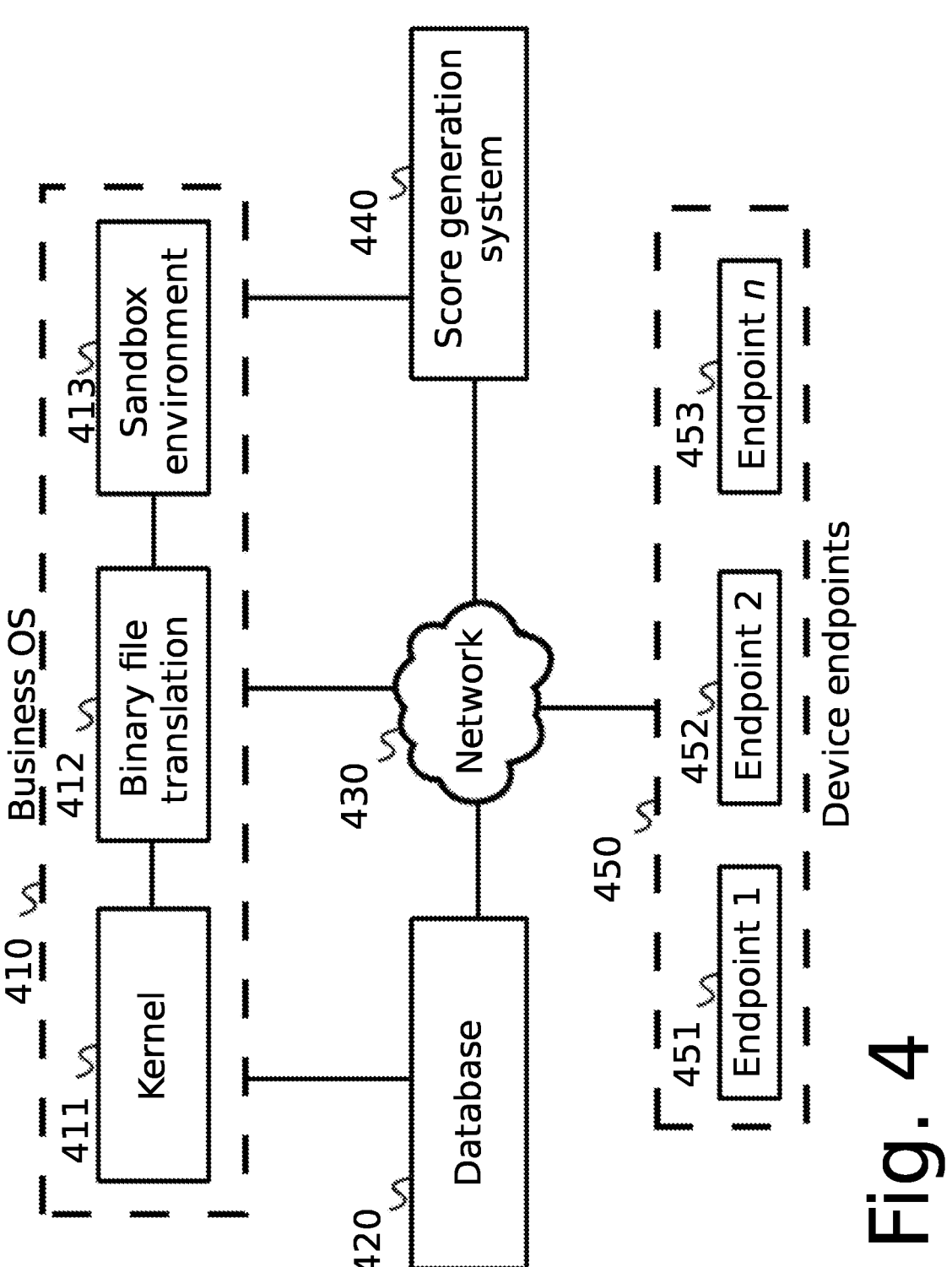
FIG. 4 is a system diagram illustrating connections between important components for analyzing software and network-connected endpoints.

FIG. 4 is a system diagram illustrating connections between important components for analyzing software and network-connected endpoints. A business operating system (OS) 410 operates on a system outlined in FIG. 2, with key components including the OS kernel 411 which is a component common to all operating systems, and on that kernel, aside from other pieces of software for other purposes, are two important engines, a binary file translator 412 and a sandbox simulation environment 413. A binary file translator 412 may convert any given file or set of input data into executable machine code, and a sandbox environment 413 is a simulation environment which may execute machine code in a closed-off environment, similar in purpose to an experiment carried out in a sealed room. This may be done in a variety of ways, including emulator software for specific system architectures and open source code executors. Such an OS 410 would be connected to a database 420, which may be formatted in Structured Query Language (SQL) form, formatted raw text, encrypted text, or no-SQL forms, and may be used in conjunction with management software such as APACHE HADOOP™ for increased performance. This connection may be either a direct physical connection, or the OS 410 and database 420 may be located on the same physical machine, or they may be connected over a network 430, including the Internet or other kinds of computer networks. Similarly, a score generation system 440 may be connected to the operating system 410, either through a network 430, or through a direct physical connection, or by operating on the same machine as the operating system 410 itself. This scoring engine is used in later figures to prioritize software vulnerabilities and exploits. A variety of device endpoints 450 may be connected over a network 430 and accessible to the operating system 410, by use of endpoint instrumentation such as OSQUERY™, and these device endpoints may be varied in form, including laptop computers, desktops, mobile phones, and various Internet of Things (IoT) devices. It is possible for only one endpoint 451 to be connected, and it is similarly possible for a multitude of various different endpoints to be connected 452, 453.

Figure 5:
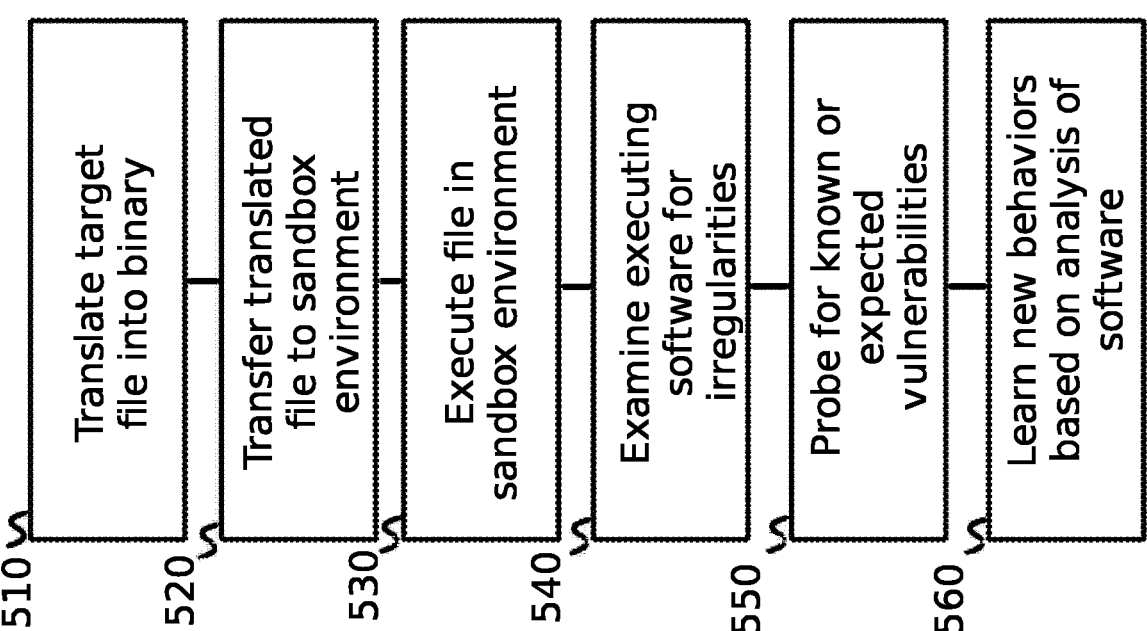
FIG. 5 is a method diagram illustrating important steps in detecting and analyzing software exploits or vulnerabilities of the invention.

FIG. 5 is a method diagram illustrating important steps in detecting and analyzing software exploits or vulnerabilities of the invention. A file that is targeted for analysis may be translated into executable binary code 510 by use of a binary translation engine 412, and this executable binary code may then be transferred to a sandbox environment 520, 413, for analysis. The specific environment in use may vary depending on the code generated by the binary translation engine 412, including hardware emulators, operating system emulators, and more. The executable binary code is then executed in the simulated environment 530, and the operating system then may examine the executing software for any irregularities 540. Irregularities include activities not normally performed by benign software including memory scanning, and deletion of the executable binary during execution (but the executing code remaining in memory), which are known patterns of malware to avoid detection and elimination. Attempted access of system files, permissions, settings, or network adapters in suspicious ways may also be classified as "irregularities," though the characterization and scope of what the operating system 410 looks for may grow and change over time as cybersecurity and malware both advance. The operating system may also probe the executing software for vulnerabilities and exploits 550, which will often be known forms of attack, such as the Heartbleed exploit in OPENSSL™, and are known to many skilled in the art of cybersecurity. The types of vulnerabilities and exploits probed for may change and grow as cybersecurity advances as a field. The operating system 410 may then learn new behaviors 560 according to the results of analysis, for example the operating system 410 may probe for the Heartbleed exploit 550 in a piece of software to see if it is prone to that exploit, and if it is, the operating system may be trained look for similar execution patterns in future software analyses to determine if a piece of software is likely to be vulnerable to the same exploit, an example of reinforcement learning 560. This may be achieved in numerous ways common in the art including neural networks, a basic decision weight system, and more, all common concepts in computer science and software development as a whole.

Figure 6:
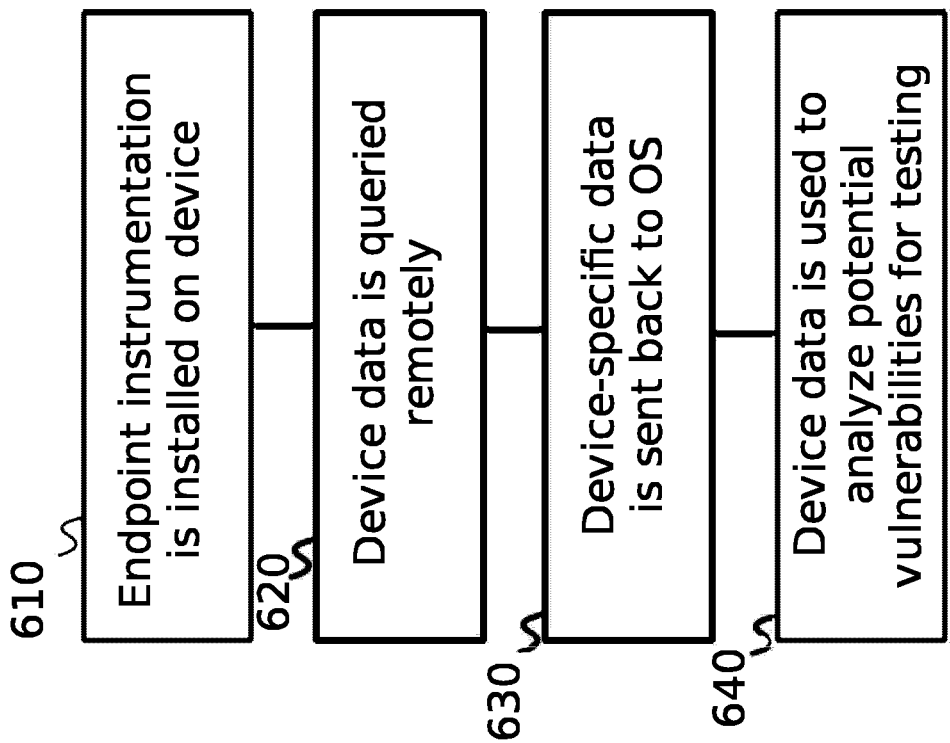
FIG. 6 is a method diagram illustrating the use of advanced endpoint instrumentation to collect data on endpoint devices across a network.

FIG. 6 is a method diagram illustrating the use of advanced endpoint instrumentation to collect data on endpoint devices across a network. First, the network endpoint must have the instrumentation installed before it can be utilized 610, and some common instrumentations include OSQUERY™ and open source fleet management software including "doorman," an open source fleet management suite for OSQUERY™. Software such as OSQUERY™ allows devices to be queried and scanned similar to data files or databases, so that property and/or relational data about the device may be scanned easily and swiftly by an authorized user, in this case the business operating system 410. Once a form of instrumentation software is installed onto the endpoints used in the system 610, device data may be remotely queried by the business operating system 620, similar to a database query over the internet. Device data is then sent back to the machine hosting the business operating system 630, which is then analyzed for potential vulnerability profiling 640. For example, certain phones that may be used in this system have various exploits and vulnerabilities that are exclusive to each other, as do many older operating systems for personal computers, and this information would be able to be queried for analysis 640.

Figure 7:
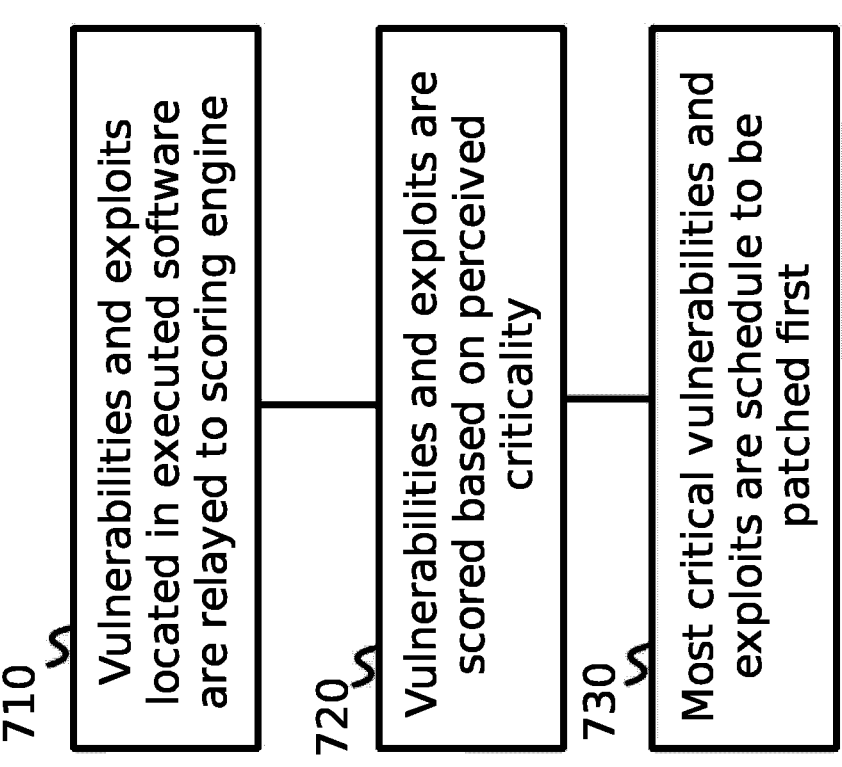
FIG. 7 is a method diagram illustrating the prioritization of software flaws and exploits according to a preferred aspect.

FIG. 7 is a method diagram illustrating the prioritization of software flaws and exploits according to a preferred aspect. Vulnerabilities and exploits found in software executed in the sandbox environment 413 are relayed to the scoring engine 440, 710, which may be either a connection over a network 430 or a direct physical connection between only the two machines, or both the scoring engine 440 and operating system 410 may be operating on the same computing device. The vulnerabilities and exploits found in the software execution may then be scored by the scoring engine 720, which will assign a higher risk level to exploits which may involve deleting system critical files, highly evasive code techniques which may evade most forms of antivirus software, and more, using a scoring methodology which may be specified and changed at any time by the user of the software. The scoring methodology may be arbitrary or follow any given set of rules specified by the user of the software, the importance of this being that as cybersecurity and malware advance, the need for a changing and advancing ranking of threats is obvious and immediate—what was considered a horrible computer virus 15 years ago may be easily detectable today, and similarly, what is considered incredibly high-risk today may be of no consequence to antivirus software 15 years from now, and therefore be categorized as a low threat to most devices. Regardless, at the time of execution, the scoring engine 440 will then inform the operating system 410 of a ranking of the found vulnerabilities or threats in the executed software 730, ranking the issues found from most dangerous or pressing, to least dangerous or pressing.

Figure 8:
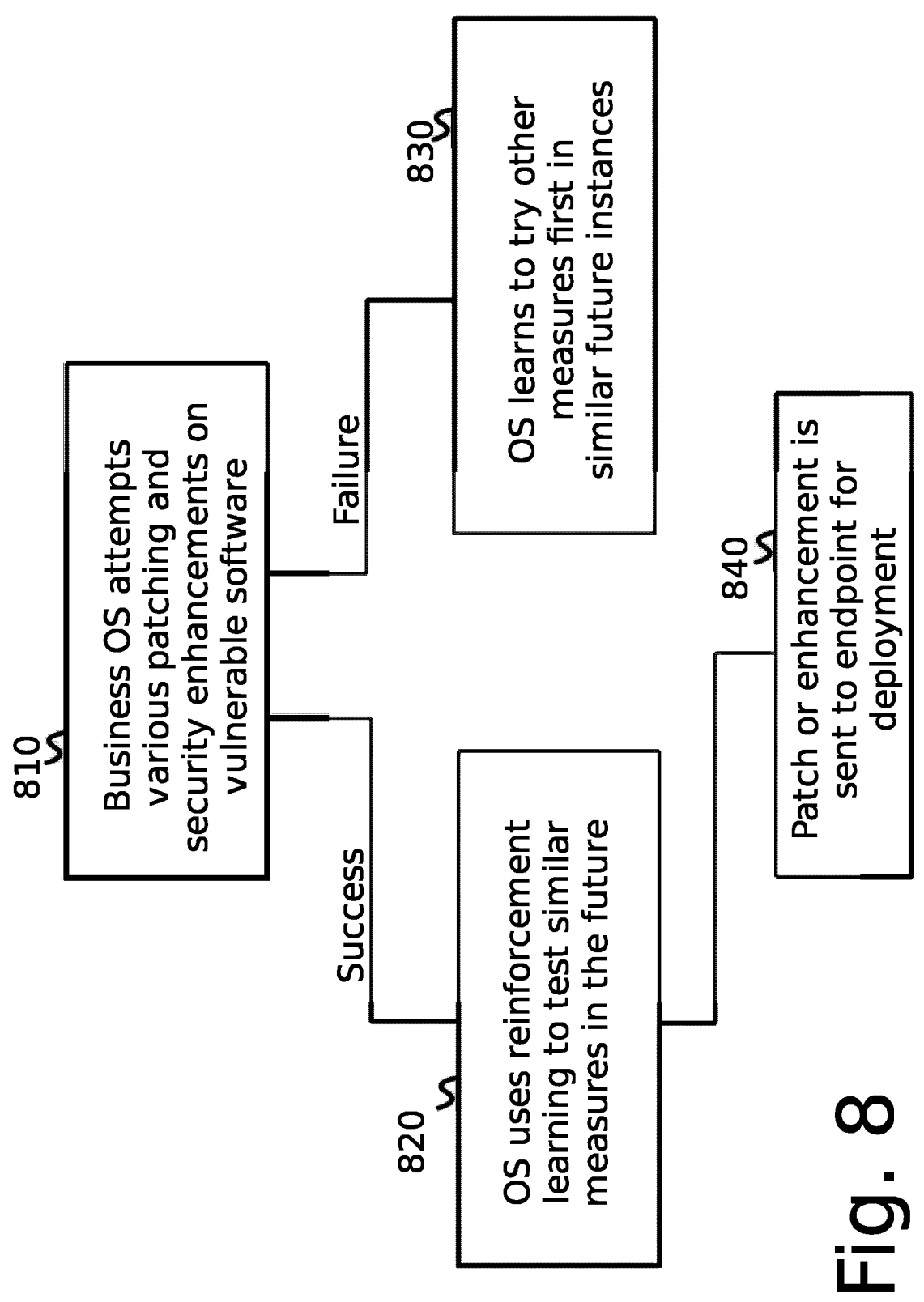
FIG. 8 is a method diagram illustrating the basic steps for patching exploits and vulnerabilities in analyzed software, according to an aspect.

FIG. 8 is a method diagram illustrating the basic steps for patching exploits and vulnerabilities in analyzed software, according to an aspect. After receiving a list of exploitable or dangerous behaviors from a simulated piece of software 730, the business operating system 410 will attempt to make any of various changes or limitations implementable at the kernel level to the software's execution 810, to "patch" the vulnerability or threat. Such measures may include techniques such as Address Space Layout Randomization (ASLR), a memory protection process which randomizes the location in computer memory where system executable code is loaded, and measures used to patch undesirable behavior or vulnerabilities may include other techniques including data execution prevention (DEP), which prevents certain sectors of memory from being executed, protecting potentially important system processes from attack. There are a large variety of security measures that may be implemented in an effort to patch software behavior, and the importance of noting that it is to patch behavior is that the system is not analyzing the code itself and re-writing code in software to be permanently patched, but rather it is changing system behavior based on observed software behavior to protect against any behavior that is either vulnerable to exploitation, or is itself malware. If an implemented patch does not solve the undesired behavior or vulnerability in the tested software, and is deemed a failure, then the operating system 410 may learn through reinforcement learning algorithms to try different measures first, if the same behavior occurs during analysis of a different piece of software 830. If the implemented patch or hotfix does stop the undesirable behavior, and is deemed a success, the operating system 410 learns, conversely to the previous situation, that this patch is an effective measure against such behaviors, and will try it sooner than other (either untested or possibly ineffective) measures that it may have tried 820. This patch or enhancement to the software's functionality is then sent to the endpoint 450, 840 which hosted this file or piece of software that was being analyzed, so that the undesired behavior or vulnerability is effectively mitigated.

Figure 9:
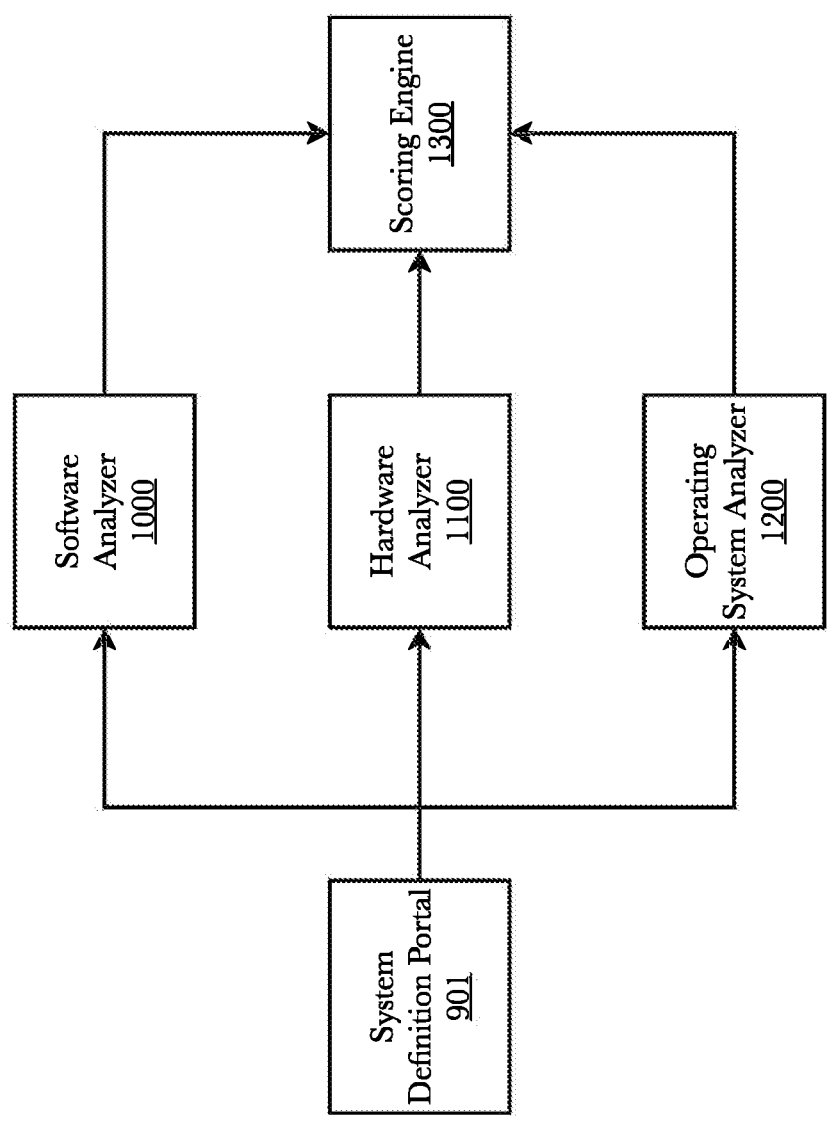
FIG. 9 is a block diagram showing an exemplary overall system architecture for a holistic computer system cybersecurity evaluation and scoring system.

FIG. 9 is a block diagram showing an exemplary overall system architecture for a holistic computer system cybersecurity evaluation and scoring system 900. In this embodiment, the system comprises a system definition portal 901, a software analyzer 1000, a hardware analyzer 1100, an operating system analyzer 1200, and a scoring engine 1300. The system definition portal 901 provides the means for a user to define the system to be tested (also known as the "system under test") in terms of its hardware, software, and operating system components. The software analyzer 1000 receives the definition of the software component of the system under test and analyzes it for cybersecurity issues. The hardware analyzer 1100 receives the definition of the hardware component of the system under test and analyzes it for cybersecurity issues. The operating system analyzer 1200 receives the definition of the software component of the system under test and analyzes it for cybersecurity issues. The scoring engine 1000 receives the analyses from the software analyzer 1000, hardware analyzer 1100, and operating system analyzer 1200, performs additional checking and testing of the system under test as a whole, and assigns a cybersecurity rating or score to the system under test as a whole computing environment. Note that an operating system is a type of software, so references to software may include operating systems where the context allows.

With respect to the system definition portal 901, in this embodiment the system definition portal 901 is a stand-alone portal allowing for definition of the entire system under test, but in other embodiments, it may be simply be an input component of the software analyzer 1000, hardware analyzer 1100, and operating system (OS) analyzer 1200. Each of the software, hardware, and operating components of the system under test can be defined in several ways. One primary method of definition is specification of the component's parameters. For the hardware component, for example, the hardware may be defined by specifying the particular components that make up the hardware (e.g., the central processing unit (CPU), memory, storage, system bus, etc.), including details such as the manufacturer, date of manufacture, model number, serial number, etc., from which the performance characteristics of each part can be obtained. Alternatively, the hardware may be defined directly in terms of performance characteristics, for example specifying the bit width (or word length) of the architecture (e.g., 32-bit, 64-bit, etc.), the processor clock speed, the bus speed, and other characteristics that determine the hardware's perfor- mance. For hardware, in particular, definitions by specifi- cation may be useful as the actual hardware may not be available or may difficult to obtain, yet can often be emu- lated using an emulator or virtual machine. Similar defini- tions by specification can be made of software and operating systems, for example specifying the software name, version, etc., from which operating characteristics may be identified, or by directly specifying the operating characteristics. While it is possible to emulate or simulate the operation of soft- ware, this is typically not done as the software is usually readily available. A second method of definition is provision of the actual software, hardware, and/or OS to be tested. For example, software and operating systems can be uploaded, the actual hardware to be tested may be provided, and in some cases the entire system may be provided for testing with the software and operating system already installed on the hardware. Where physical hardware is used to define the hardware under test, the actual physical computing device may be used as the hardware under test. In some cases, the physical hardware may be physically transported (e.g., delivery, drobox, etc.), while in other cases the physical hardware may be accessed and operated locally (i.e., onsite), while in yet other cases the physical hardware may be accessed and operated remotely (e.g., via a terminal asso- ciated with the physical hardware, remote device control using a different computer, screensharing, etc.).

A further aspect of the system definition portal 901 is that information about the usage of the computer system under test may be specified for scoring purposes. For example, the domain in which the computer system will be used, the use to which the computer system will be put, the criticality of the computer system to overall operations of a business or larger network of computers, and the magnitude of losses that would occur if the system was compromised may all be entered to more precisely define the parameters of the evaluation and scoring. This list is not intended to be exhaustive, and other such information and parameters may be used.

Figure 10:
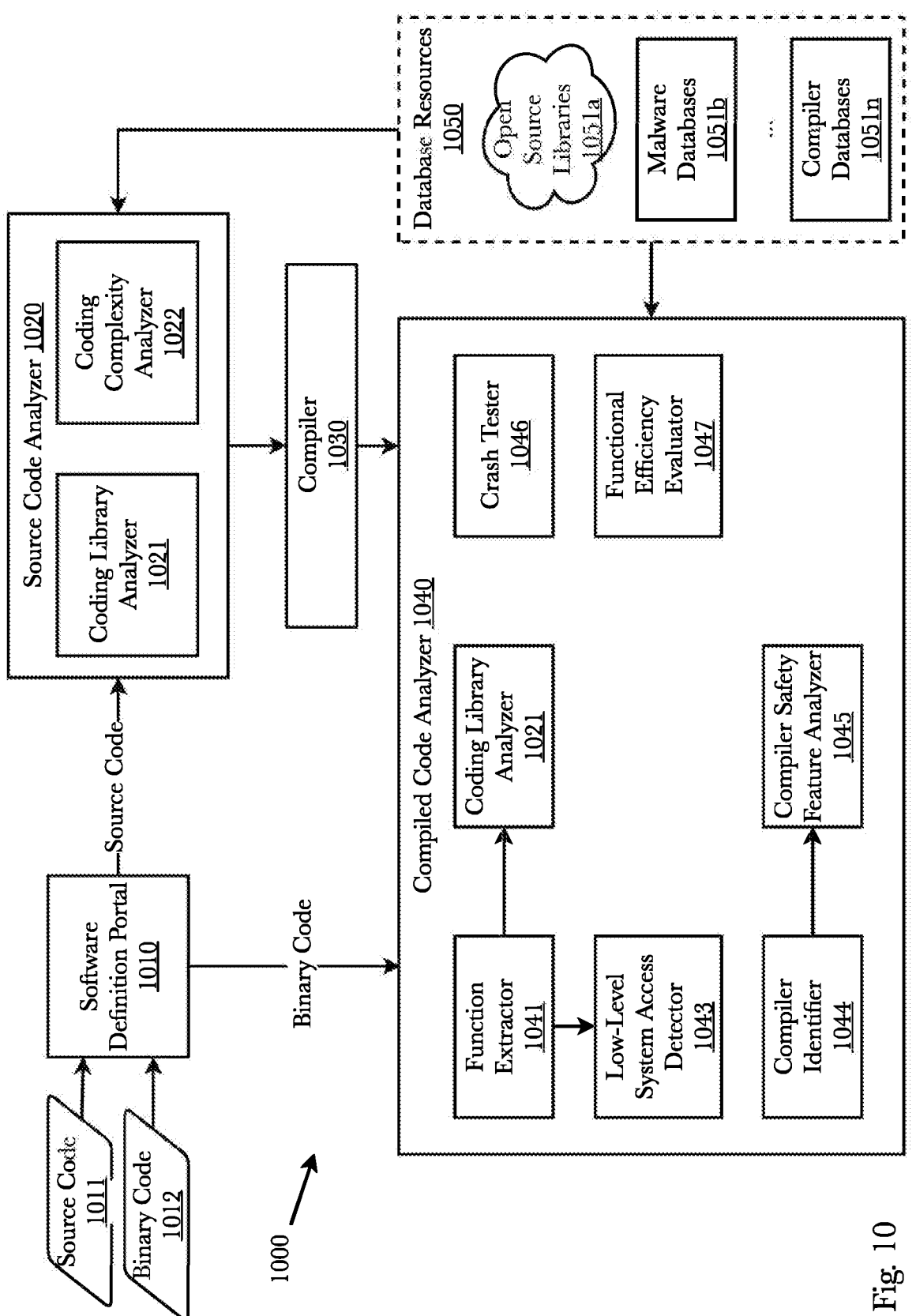
FIG. 10 is a block diagram showing an exemplary architecture for a software analyzer for a holistic computer system cybersecurity evaluation and scoring system.

FIG. 10 is a block diagram showing an exemplary archi- tecture for a software analyzer 1000 for a holistic computer system cybersecurity evaluation and scoring system. In this embodiment, the software analyzer 1000 comprises a soft- ware definition portal 1010, a source code analyzer 1020, a compiler 1030, a compiled code analyzer 1040, and one or more database resources 1050. The software definition por- tal 1010 receives either uncompiled, human-readable source code 1011, or compiled machine-readable binary code 1012 to define the software component of the system under test. In this example, definition by specification is not used, and it is assumed that the software to be tested is provided. If source code 1011 is provided, the software definition portal 1010 forwards the source code 1011 to the source code analyzer 1020 for coding analysis prior to compiling.

The source code analyzer 1020 comprises a coding library analyzer 1021 and a coding complexity analyzer 1022. The coding library analyzer searches the code for functions, classes, modules, routines, system calls, and other portions of code that rely on or incorporate code contained in code libraries developed by a different entity than the entity that developed the software under test. Code libraries are col- lections of code that have been developed for use in specific circumstances, such as standardized classes developed for an object-oriented coding language (e.g., C++, JAVA, etc.), tools developed for a particular integrated development environment (e.g., Code::Blocks, Eclipse), common librar- ies for interacting with the operating system, templates, subroutines, etc., that are designed to help speed up, stan- dardize, or make easier the coding of applications. The code in such libraries is of varying quality, complexity, usability, security, etc. Code in open source libraries is particularly variable, depending on the skill and knowledge of the (usually part-time, volunteer) contributors, and subject to deprecation if maintenance of the code slows or stops. The source code analyzer 1021 uses this information to deter- mine which code libraries are used, what code from the libraries is used, and the security level of that code, and the security level of the source code 1011 as a result of using code from those libraries. The coding library analyzer 1021 may access one or more database resources 1050 such as open source libraries 1051*a*, malware databases 1051*b*, lists of deprecated or out of date software, etc.

The coding complexity analyzer 1022 analyzes the level of additional cybersecurity risk due to the complexity of the code. As an illustrative example, the cyclomatic complexity of a particular software package is a strong indicator of the number of errors that are likely to be in the code. The cyclomatic complexity of a piece of software is a quantita- tive measure of the number of linearly independent paths through a program's source code.

After the source code analyzer 1020 has completed analy- sis of the source code 1011, the source code 1011 is compiled by a compiler 1030 for operational testing. The compiler 1030 used will depend on the language in which the source code 1011 was written. Many different compilers 1030 may be available for any given coding language.

Binary code 1012, whether received directly by the soft- ware definition portal 1010 or compiled by the compiler 1030 from source code 1011, is sent to a compiled code analyzer 1040 which analyzes the software while it is in operation (i.e., running) on hardware under an operating system. While the software is running, a function extractor 1041 monitors which operations are performed by the soft- ware, the order of such operations, and which system resources are accessed by the software, which can disclose the functions, subroutines, etc., that are being executed by the compiled code. The characteristics of those functions, subroutines, etc., can be matched to similar functions, sub- routines, etc., in coding libraries and such that the function extractor can identify code from code libraries that are contained in, and being used by, the compiled software. This information about the binary code 1012 can be sent to the coding library analyzer 1021 for analysis (typically where such analysis has not already been performed by the source code analyzer 1020). Further, a low-level system access detector 1043 will simultaneously monitor the running soft- ware to identify access of, or attempted access of, low-level system resources (e.g., kernel, stack, heap, etc.) that may indicate cybersecurity concerns. A compiler identifier 1044 can be used to identify the compiler used to create the binary code 1012 and certain information about the settings used when during compilation. In many cases, compilers embed information in the compiled code such as the compiler identification, version number, settings, etc., in a comment section composed of ASCII text. The binary can be scanned for such textual information. Alternatively, the binary file can be "decompiled" or "disassembled" in an attempt to match the inputs and outputs of known compilers. The compiler identifier 1044 may access one or more database resources 1050 to make its determination, such as a database of compilers 1051n and their identifications. An important aspect of cybersecurity analysis of software is determining whether or not a compiler's safety features were enabled, which is done by the compiler safety feature analyzer 1045. Modern compilers have the ability to substitute insecure functions called for in the source code with more secure versions that perform the same functions. However, if this feature is not enabled, the functions will not be substituted. Enablement of the safety features can be determined using the same methods as for compiler identification. A crash tester 1046 may be used to determine the robustness of the software to bad inputs or attempts to crash or hang the software by intentionally inputting improper or unexpected information. Further, a functional efficiency evaluator 1047 may be used to evaluate whether the software does what it purports to do, and its level of efficiency in doing so. For example, if the software is a malware detector, the functional efficiency evaluator 1047 may determine whether it functions as such, and evaluate what percentage of malware introduced into the computer system it detects and quarantines.

Figure 11:
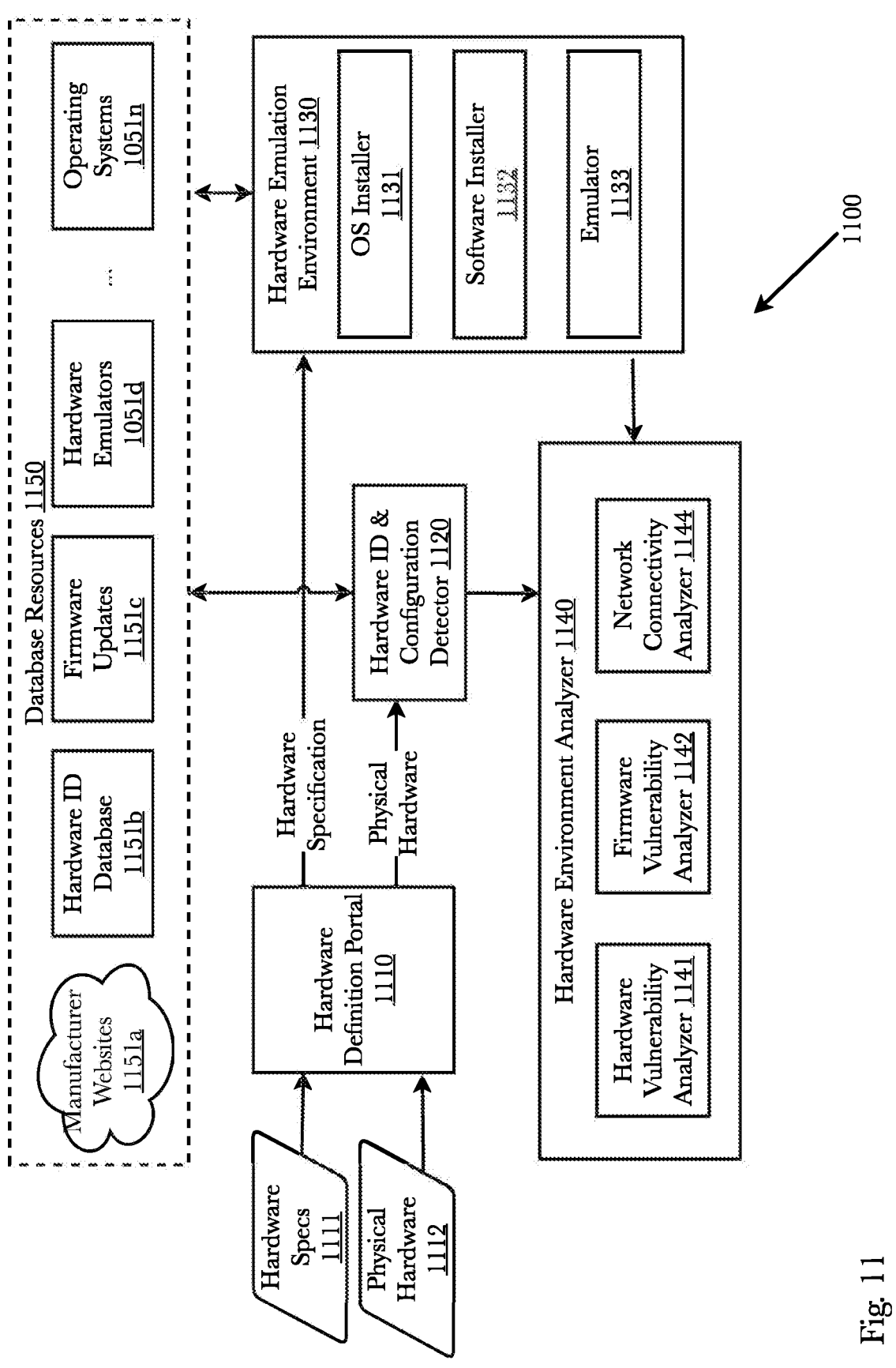
FIG. 11 is a block diagram showing an exemplary architecture for a hardware analyzer for a holistic computer system cybersecurity evaluation and scoring system.

FIG. 11 is a block diagram showing an exemplary architecture for a hardware analyzer 1100 for a holistic computer system cybersecurity evaluation and scoring system. In this embodiment, the hardware analyzer 1100 comprises a hardware definition portal 1110, a hardware identification and configuration detector 1120, a hardware emulation environment 1130, a hardware environment analyzer 1140, and one or more database resources 1150. The hardware definition portal 1110 receives either hardware specifications 1111 to define the hardware under test or physical computer hardware 1112 (e.g., via delivery, a drobox, etc.) as the hardware under test.

Where the hardware is defined by specification 1111, the hardware may be defined by specifying the particular components that make up the hardware (e.g., the central processing unit (CPU), memory, storage, system bus, etc.), including details such as the manufacturer, date of manufacture, model number, serial number, etc., from which the performance characteristics of each part can be obtained. Alternatively, the hardware may be defined directly in terms of performance characteristics, for example specifying the bit width (or word length) of the architecture (e.g., 32-bit, 64-bit, etc.), the processor clock speed, the bus speed, and other characteristics that determine the hardware's performance. The operation of hardware defined by specification can be emulated using an emulator or virtual machine. Where physical hardware is used to define the hardware under test 1112, the actual physical computing device may be used as the hardware under test. In some cases, the physical hardware may be physically transported (e.g., delivery, drobox, etc.), while in other cases the physical hardware may be accessed and operated locally (i.e., onsite), while in yet other cases the physical hardware may be accessed and operated remotely (e.g., via a terminal associated with the physical hardware, remote device control using a different computer, screensharing, etc.).

Where the hardware is defined by specification 1111, the hardware definition portal 1110 sends the hardware specification 1111 to a hardware emulation environment 1130. The hardware emulation environment 1130 is a computing device configured to emulate the operation of the hardware defined by the specification 1111. Emulation is usually performed by running emulation software on a computer that is more powerful than the hardware being emulated, to account for the additional processing overhead of the emulator itself in addition to the processing within the emulated hardware. The hardware emulation environment 1130 comprises an operating system installer 1131, a software installer 1132, and the emulator 1133. In some embodiments, the OS installer 1131 and software installer 1132 will be part of the emulator 1133. The OS installer 1131 installs the operating system under which certain software will run. The software installer 1132 installs software to run on the hardware. When testing the hardware platform separately, this software may or may not be the software under test. For example, in some tests, the software may be a benchmarking application designed to generate artificial loads, or other functional application designed to test the operation of the hardware under test. Once the OS and software are installed, and the emulator 1133 is operating, the emulator acts as the hardware under test, and can be analyzed by the hardware environment analyzer 1140, just as physical hardware would be. The hardware emulation environment 1130 may use one or more database resources 1150 such as databases of downloadable hardware emulators 1051d, operating systems 1051n, etc. In some embodiments, emulation is not required at the hardware analysis stage (but may be used in a later stage when the system is evaluated as a whole), and the hardware specifications 1111 are passed directly to the hardware environment analyzer 1140.

Where physical hardware is used to define the hardware under test 1112, a hardware identification and configuration detector 1120 is run, which automatically identifies the type of hardware, its components, its performance specifications, and its configuration. Modern operating systems conduct a series of port checks and queries of hardware components attached to a computer system each device returns its device identifier (e.g., CPU ID, MAC address, etc.), which is then matched against lists of such identifiers to determine various characteristics of that hardware component (e.g., type of hardware, manufacturer, performance characteristics, size of storage, etc.). The hardware components and their characteristics can generally be obtained by querying the operating system about hardware that makes up the computer system. Where the operating system cannot identify a hardware component, the hardware component can be queried directly, and database resources 1150 external to the operating system may be used to identify the hardware component such as manufacturer websites 1151a, hardware ID databases 1151b, etc. Once the hardware and its configuration have been identified by the hardware ID and configuration detector 1120, operation passes to the hardware environment analyzer 1140.

The hardware environment analyzer 1140 conducts one or more analyses of the hardware. The hardware vulnerability analyzer 1141 can conduct either static evaluations or dynamic testing of the hardware for vulnerabilities. For example, the hardware vulnerability analyzer 1141 may search a number of database resources 1050 such as manufacturer websites 1151a, hardware ID databases 1151b, etc., to identify known vulnerabilities in the physical configuration of the hardware. For example, the most notorious hardware security flaw to date (commonly known as Spectre and Meltdown, which are variants on the flaw) was identified in 2018 and affected nearly every computer chip manufactured in the two decades prior to 2018. The flaw involved exploiting speculative execution and caching to gain access to information that was supposed to be secure. Where database results cannot be used or are inconclusive, the operation of the hardware can be tested by running operations on the hardware associated with known hardware exploits to determine whether the hardware is susceptible to such exploits. The firmware vulnerability analyzer 1142, operating system analyzer 1143, and network connectivity analyzer 1144 operate similarly, first checking database resources 1150 such as firmware updates 1151$c$, operating systems, updates, and patches 1051$n$, etc., to determine known vulnerabilities based on hardware components identified in the hardware under test, and performing operational testing of the hardware components in cases where the database results cannot be used or are inconclusive.

Figure 12:
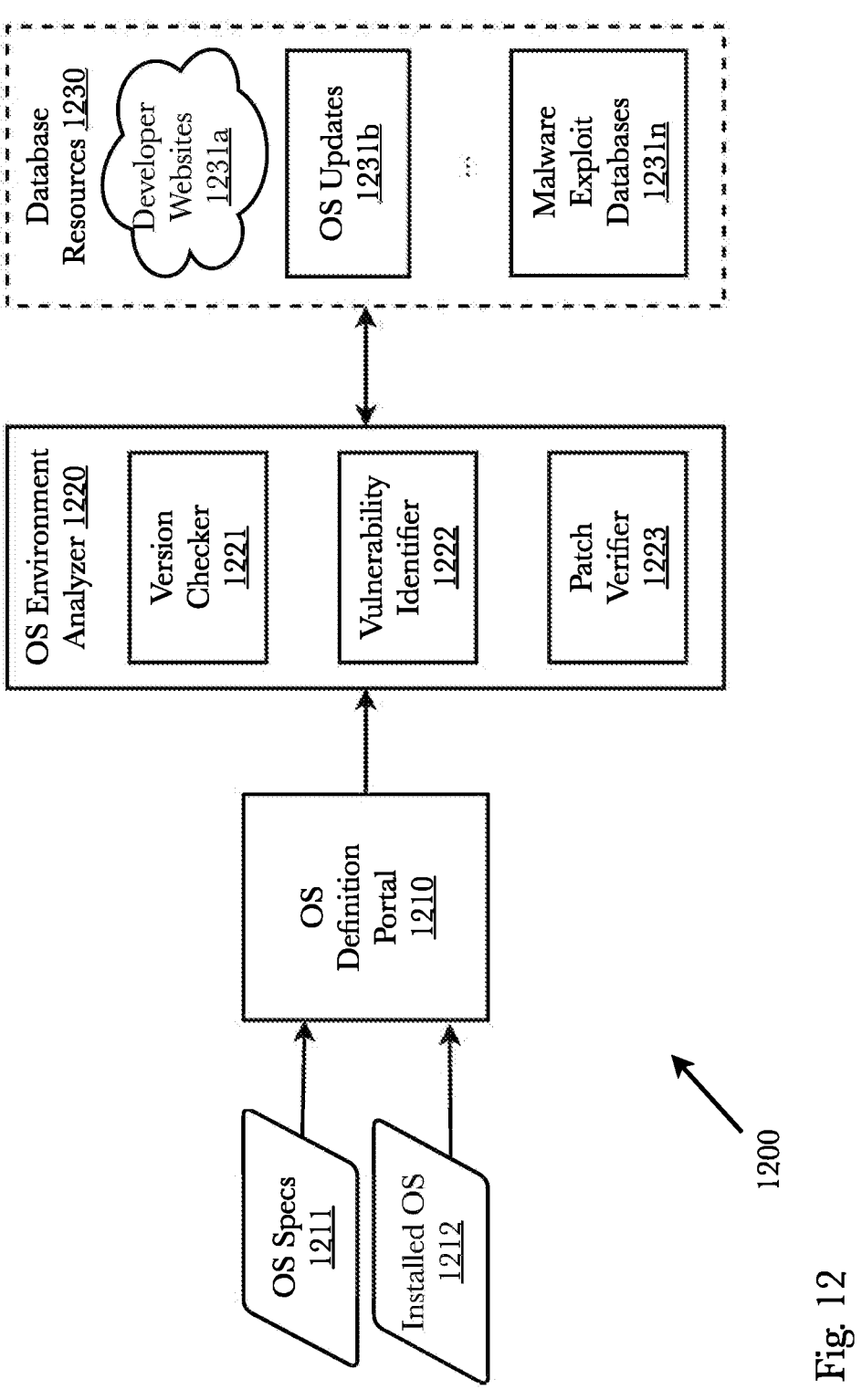
FIG. 12 is a block diagram showing an exemplary architecture for an operating system analyzer for a holistic computer system cybersecurity evaluation and scoring system.

FIG. 12 is a block diagram showing an exemplary architecture for an operating system analyzer 1200 for a holistic computer system cybersecurity evaluation and scoring system. In this embodiment, the operating system (OS) analyzer 1200 comprises an OS definition portal 1210, an OS environment analyzer 1220, and one or more database resources 1230. The OS definition portal 1210 receives either operating system specifications 1211 or uses an installed operating system to define the operating system component of the system under test. In this example, definition by installation 1212 is not used, and it is assumed that the definition of the operating system 1211 will be sufficient to conduct the analysis. However, in some embodiments, testing on an installed operating system may be performed as is the case for hardware analysis above. While operating systems are software, they provide low-level functionality to allow applications to operate on the hardware.

The OS definition portal 1210 forwards the OS specifications 1211 to an operating system environment analyzer 1220, whose functions are similar in nature to those of the hardware environment analyzer 1140. The version checker 1221 may search a number of database resources 1230 such as developer websites 1231$a$, OS update databases 1231$b$, malware exploit databases 1231$n$, etc., to identify known vulnerabilities in the operating system. A patch verifier 1223 can determine whether patches are available and/or installed for any identified vulnerabilities. Where database results cannot be used or are inconclusive, the security of the operating system can be tested by running operations on the hardware associated with known hardware exploits to determine whether the hardware is susceptible to such exploits. One area in which this capability is particularly useful is in industrial control systems, which often have older and customized/proprietary hardware and operating systems installed which cannot be upgraded without major upgrades throughout the facility. In such cases, operating tests can be conducted by the vulnerability identifier 1222 to identify security issues common on such older and/or customized systems such as whether any passwords or authentications at all are required, password length, use of group-based passwords, transmission of plain (unencrypted) text, ease of user access to low-level system operations, application access to low-level system components like the kernel, stack, and heap, and the like.

Figure 13:
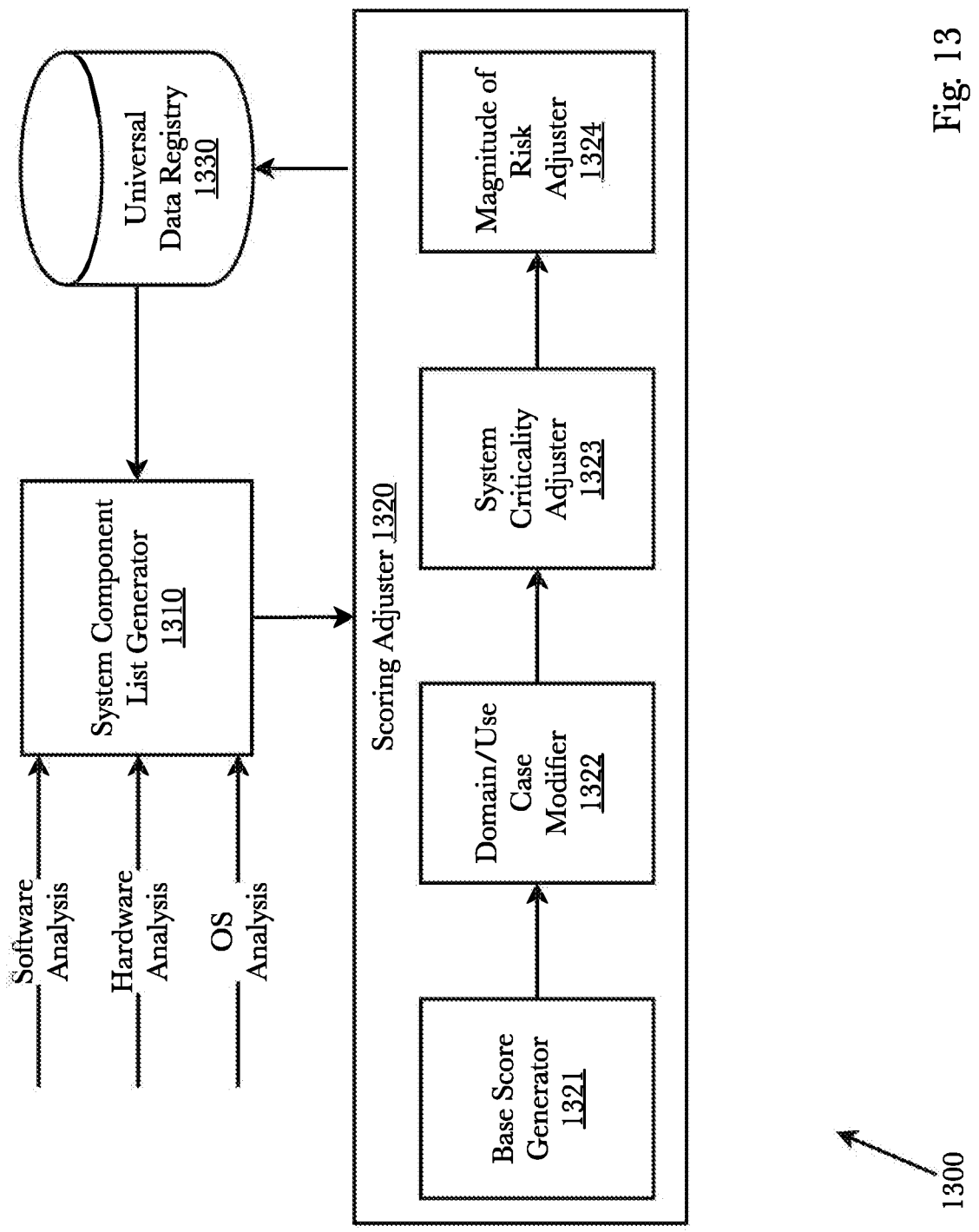
FIG. 13 is a block diagram showing an exemplary architecture for a scoring engine for a holistic computer system cybersecurity evaluation and scoring system.

FIG. 13 is a block diagram showing an exemplary architecture for a scoring engine 1300 for a holistic computer system cybersecurity evaluation and scoring system. The separate software, hardware, and operating system analyses are fed into a system component list generator 1310, which compiles a comprehensive list of all system components (in a manner similar, for example, to a bill of materials for manufactured or constructed projects). This comprehensive list can be compared with a universal data registry 1330 to determine whether similar or identical systems have been evaluated and scored in the past, in which case the prior evaluation and scoring may be used to speed up the analysis or avoid some or all of the evaluation process. In some embodiments, the system component list generator 1310 receives a list of all identified software, hardware, and operating system components before the software, hardware, and operating system analyses are conducted, and allowing for scoring to be based on prior analyses of some or all of the components of the system under test without having to repeat those analyses. The system component list generator 1310 sends the comprehensive list of system components, the results of the software, hardware, and OS analyses and any prior evaluations and scoring from the universal data registry 1330 to a scoring adjuster 1320 for scoring.

The scoring adjuster 1320 comprises a base score generator 1321, a domain and use case modifier 1322, a system criticality 1323 adjuster, and a magnitude of risk adjuster 1324. The base score generator 1321 calculates a base cybersecurity score for the system as a whole, based on all information received by the scoring adjuster 1320. The domain and use case modifier 1322 modifies the score to account for the domain and/or use case in which the system will be used. For example, the base score of a given computer system may be adjusted downward if that computer system is to be used in the finance industry, where a greater level of security is required, and adjusted upward if the computer system is to be used in the retail industry where it will be used for the less critical purpose of tracking inventory. The system criticality 1323 adjuster may further adjust the score to account for the criticality of the system in overall operations. For example, even in the finance industry, a given computer system used primarily for document production will be less critical that the same system used to manage account passwords. Finally, the magnitude of risk adjuster 1324 may be used to further adjust the score based on the magnitude of the losses and/or damage that would occur if the computer system is compromised. For example, a small, desktop computer that stores passwords for access to online financial accounts would have a very large impact if compromised, so the score storage of such passwords on that computer cause the score to be reduced. The evaluation and scoring, component lists, and other information may be stored in the universal data registry 1330 for evaluations and comparisons with other systems.

Figure 14:
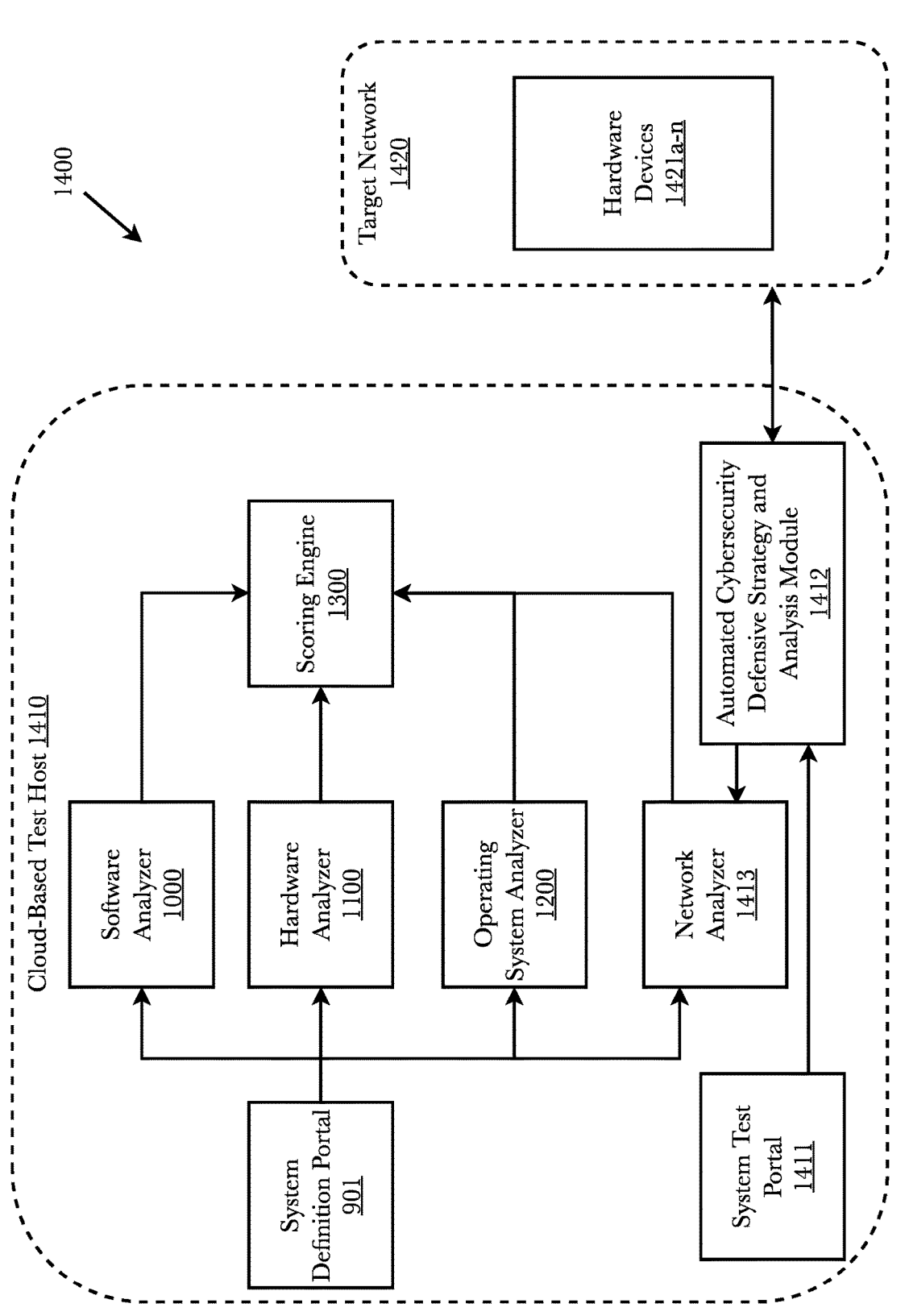
FIG. 14 is a block diagram illustrating an exemplary architecture for an embodiment of a holistic network cybersecurity evaluation and scoring system configured to provide hardware exploit testing on external networks utilizing virtualized network testing.

FIG. 14 is a block diagram illustrating an exemplary architecture for an embodiment of a holistic computer system cybersecurity evaluation and scoring system configured to provide hardware exploit testing on external networks utilizing virtualized network testing. In this embodiment, the system 1400 comprises a cloud-based test host 1410 which applies hardware emulation techniques described herein to a target network 1420 while operating outside of the target network. The cloud-based test host 1410 may be a specifically configured and/or augmented embodiment of a holistic computer system cybersecurity evaluation and scoring system which, based on the configuration, provides target network 1420 virtualized testing of an entire target network comprising a plurality of hardware devices 1421$a$-$n$ and the physical and logical connections between and among the plurality of hardware devices 1421$a$-$n$ via a hardware emulator. Cloud-based test host 1410 may function as a single computing device on which to emulate an entire target network 1420, or it may function as distributed system wherein two or more computing devices are used to provide target network testing and scoring. In a distributed architecture, the two or more computing devices may be disposed in a single location (e.g., data center) or the two or more computing devices may be operating in two separate locations (e.g., a first data center and a second data center). By utilizing a cloud-based architecture, system 1400 can dynamically adapt and quickly scale to meet the processing needs that may be required to emulate an entire target network 1420.

According to the embodiment, cloud-based test host 1410 may comprise a system definition portal 901, a software analyzer 1000, a hardware analyzer 1100, an operating system analyzer 1200, and a scoring engine 1300. For more details on these system components, please refer to FIG. 9, FIG. 10, FIG. 11, FIG. 12, and FIG. 13 respectively. The system definition portal 901 provides the means for a user to define the system to be tested (also known as the "system under test") in terms of its hardware, software, and operating system components. The software analyzer 1000 receives the definition of the software component of the system under test and analyzes it for cybersecurity issues. The hardware analyzer 1100 receives the definition of the hardware component of the system under test and analyzes it for cybersecurity issues. The operating system analyzer 1200 receives the definition of the software component of the system under test and analyzes it for cybersecurity issues. The network analyzer 1413 receives the definition of the hardware and the definition of the target network 1420 and analyzes it for cybersecurity issues. The scoring engine 1000 receives the analyses from the software analyzer 1000, hardware analyzer 1100, operating system analyzer 1200, and network analyzer 1413 performs additional checking and testing of the system under test as a whole, and assigns a cybersecurity rating or score to the system under test as a whole computing environment. Note that an operating system is a type of software, so references to software may include operating systems where the context allows.

With respect to the system definition portal 901, in this embodiment the system definition portal 901 is a stand-alone portal allowing for definition of the entire system under test (i.e., target network 1420), but in other embodiments, it may be simply be an input component of the software analyzer 1000, hardware analyzer 1100, operating system (OS) analyzer 1200, and network analyzer 1413. Each of the software, hardware, and operating components of the system under test can be defined in several ways. One primary method of definition is specification of the component's parameters. For the hardware component, for example, the hardware may be defined by specifying the particular components that make up the hardware (e.g., the central processing unit (CPU), memory, storage, system bus, etc.), including details such as the manufacturer, date of manufacture, model number, serial number, etc., from which the performance characteristics of each part can be obtained. Alternatively, the hardware may be defined directly in terms of performance characteristics, for example specifying the bit width (or word length) of the architecture (e.g., 32-bit, 64-bit, etc.), the processor clock speed, the bus speed, and other characteristics that determine the hardware's performance. The hardware may be defined using memory maps. Memory maps are used to associate hardware components of a physical hardware system (e.g., hardware devices 1421*a-n*) and memory locations of the virtualized system. In other words, a memory map reproduces the memory locations used by the physical hardware of the target network 1420 to exchange information while also describing the connections between components of the physical hardware system of target network 1420 from a memory interface perspective. For example, a memory map can represent locations of information for memory registers of hardware devices 1421 of the target network 1420 as an offset from the starting memory address. Furthermore, a hardware device may be defined by the interrupt logic which can be information describing the interrupt functionality of the hardware devices 1421*a-n*.

For hardware, in particular, definitions by specification may be useful as the actual hardware may not be available or may difficult to obtain, yet can often be emulated using an emulator or virtual machine. Similar definitions by specification can be made of software and operating systems, for example specifying the software name, version, etc., from which operating characteristics may be identified, or by directly specifying the operating characteristics. While it is possible to emulate or simulate the operation of software, this is typically not done as the software is usually readily available. A second method of definition is provision of the actual software, hardware, and/or OS to be tested. For example, software and operating systems can be uploaded, the actual hardware to be tested may be provided, and in some cases the entire system may be provided for testing with the software and operating system already installed on the hardware. Where physical hardware is used to define the hardware under test, the actual physical computing device may be used as the hardware under test. In some cases, the physical hardware may be physically transported (e.g., delivery, drobox, etc.), while in other cases the physical hardware may be accessed and operated locally (i.e., onsite), while in yet other cases the physical hardware may be accessed and operated remotely (e.g., via a terminal associated with the physical hardware, remote device control using a different computer, screensharing, etc.).

Cloud-based test host 1410 further comprises a system test portal 1411 an automated defensive strategy and analysis module 1412. System test portal 1411 provides the means for a user to define the test case to be tested on the target network 1420. Additionally, or alternatively, system test portal 1411 can allow for a user to configure a virtual machine and upload it to cloud-based test host 1410. Cloud-based test host 1410 can create a plurality of virtual machines based on the user configuration, thereby enabling the system 1400 to dynamically scale with the size of the target network. In some implementation, a set of clones of an emulated device, system, or network are created and tools are injected in each clone for testing. Automated cybersecurity defensive strategy analysis and recommendation module 1412 may be utilized to perform various tasks. For example, automated cybersecurity defensive strategy (ACDS) analysis and recommendation module may be leveraged to provide: simulated/emulated representations of a target network under test; a network score based on test results and analysis thereof; and the capture of system characteristics and information about the operation of the network under test during exploit testing. ASDS module 1412 may comprise a reconnaissance engine configured to capture network information about a target network 1420. The network information may comprise system information and characteristics generated by target network 1420 nodes (i.e., hardware devices, resources) associated with the target network 1420. ACDS module 1412 may leverage a cyber-physical graph which is used to represent a completer picture of an organization's infrastructure and operations, including, importantly, the organization's computer network infrastructure. Target network information captured by reconnaissance engine and the device classifications it generates may be used by hardware emulator or a machine learning simulator to create an accurate virtualized model of the target network 1420. ACDS module 1412 may also function as a centralized test generation and deployment mechanism wherein ACDS module 1412 can receive user submitted test cases from system test portal 1411 or use a plurality of tests and tools stored in the module to perform exploit testing on the target network 1420. In some implementations, the exploit testing comprises penetration testing.

Target network information may be used to define a target network and sent to network analyzer 1413 which may also receive hardware definitions from system definition portal 901 and use this information to establish a network cybersecurity score. The network cybersecurity score may be used an input into scoring engine 1300 to generate an overall cybersecurity score for a target network 1420. In some implementations, network analyzer 1413 or the functionality it provides may be integrated with ACDS module 1412, wherein the ACDS module 1412 performs automated testing and analyzes an entire virtualized target network's response to the test, and outputs a risk score which measures the vulnerability of the target network to an exploit or compromise. The risk score can be used as a network cybersecurity score which can then be fed into scoring engine 1300 as an input to determine an overall cybersecurity score for the target network 1420. For more detailed information regarding ACDS module 1412 please refer to U.S. patent application Ser. No. 17/567,060, the entirety of which is included herein by reference.

According to the embodiment, the system is configured to provide hardware exploit testing on external networks. In some implementations, the hardware exploit testing on external networks is provided by applying the hardware emulation techniques described herein to networks from testing hosts operating outside the target network. Testing the hardware components of a network (e.g., modems, Ethernet hubs, network switches, routers, etc.) and the connections between and among the hardware components can provide a few benefits. For example, using an external testing host 1410 provides ease of management and ease of deployment because it does not require a network connected resource (e.g., a computing device, hardware component, etc.) to be identified to be used as a host for the emulated environment and as a result there is no need to create tests on the machine where the emulation will occur. System 1400 leverages the fact that while emulation of hardware components is host-specific; test case needs are not. As a result, system can provide for centralized test generation and deployment to one or more target networks and/or one or more hosts in a target network.

Centralized test generation and deployment can be used to scale up the testing capabilities of the system as well as to provide test cases to various and/or multiple targets. In some implementations, system can implement modular test case components such that a user can create a test case. Examples of modular test case components may include, but are not limited to, known exploits the user wishes to test for and against, known hardware the user wants to include or not include in a test case, plug-and-play hardware configurations using known components (configurations may be user inputted, or obtained from database resources 1150 which provide hardware configuration information), and/or preconfigured rules that indicate dependencies and processes that govern interaction between hardware, software, and/or applications (e.g., Operating System, etc.). The test cases may be stored in a database and retrieved when a particular test case has been selected to be used to test the target network. Test cases can be used on various/multiple targets to improve testing speed and throughput. For example, system can allow for testing of multiple hosts in a target network with a single test case, allow for the testing of multiple networks using a single test case, or allow for scheduled testing to see if countermeasures (e.g., output recommendations) are working or if the patches have been deployed properly. In some implementations, a user, such as a customer of a cloud service, can configure an initial test virtual machine on a cloud platform. One or more components of the cloud architecture can then scale to test the service/software/hardware by creating multiple tenant virtual machines with the user configuration, can run tests, and can report results.

According to the embodiment, system 1400 is configured to provide virtualized network testing by emulating a target network 1420 hardware 1421*a-n* and connections (e.g., both physical and logical) between and among the network hardware. An hardware emulator or machine learning simulator can be leveraged to virtualize entire networks in a testing environment (e.g., cloud-based test host 1410) which provides an isolated, virtualized sandbox, then safely attack them using various attack and exploit vectors. Emulating network hardware allows the same hardware exploit testing as described herein, but with specialized hardware components and embedded system. Network emulations enable broad testing of network attacks and various compromises such as, for example, Kerberos attacks, database attacks, and man-in-the-middle attacks, to name a few. Additionally, using virtual hardware and virtual networking gives a more complete picture with a virtualized sandbox. For example, a user (e.g., individual or enterprise) may wish to know how different attacks work together to compromise a network, which is difficult if not near impossible to tell from testing a single virtual machine. As another example, using only discrete testing of virtual hardware to identify how an attacker would daisy-chain attacks to get what they want is impossible because to properly test for this scenario multiple virtual machines are needed with different hardware all connected as they would be in a live system.

FIG. 15 is a flow diagram illustrating an exemplary method for emulating, testing, and scoring a target network using a cloud-based test host. According to the embodiment, the process begins at step 1502 when a hardware emulator receives, retrieves, or otherwise obtains hardware definition(s) for a plurality of hardware devices 1421*a-n* of a target network 1420. Hardware definitions may comprise operating components, performance characteristics, and/or memory maps associated with one or more of the plurality of hardware devices 1421*a-n*. Hardware emulator may also receive, retrieve, or otherwise obtain target network definitions from ACDS module 1412 or one of its components such as a reconnaissance engine at step 1504. Target network definitions may comprise network information and characteristics. Target network definitions may be used to create a cyber-physical graph representation of the target network, wherein the nodes of the graph represent hardware devices 1421*a-n* and resources, and wherein the edges of the graph represent connection and dependencies between and among the hardware devices of the target network. At step 1506 hardware emulator uses the hardware definitions and network definitions to emulate the target network in secure, isolated virtual test environment (i.e., cloud-based test host 1410). The emulated target network may be represented on a virtual machine or machines operating in a cloud environment of a cloud-based service provider. Once the entire target network, including the plurality of hardware devices 1421*a-n* and the connections between and among the network devices, have been emulated the next step 1508 is to perform a test on the emulated target network. Tests may be configured to execute an attack associated with a known hardware exploit on the emulated target network. In some implementations, the test performed on the emulated target network may comprise a penetration test. Furthermore, a penetration test may be performed on a live network and the response by the live network to the penetration test may be used as an input to create a network definition, which can then be used to emulate a virtualized version of the live network (i.e., the target network 1420).

Hardware emulator at step 1510 can use the hardware definition and the test results to analyze the target networks response to a hardware exploit test. Based on this analysis, hardware emulator can determine a network cybersecurity score at step 1512, which can be sent to scoring engine 1300 to be used as an input to update the overall cybersecurity score for the target network 1420 at step 1514. According to this embodiment, system 1400 can provide holistic network cybersecurity evaluation and scoring using a test host system operating outside the target network.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the aspects disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific aspects, at least some of the features or functionalities of the various aspects disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some aspects, at least some of the features or functionalities of the various aspects disclosed herein may be implemented in one or more virtualized computing environments (e.g., network computing clouds, virtual machines hosted on one or more physical computing machines, or other appropriate virtual environments).

Figure 16:
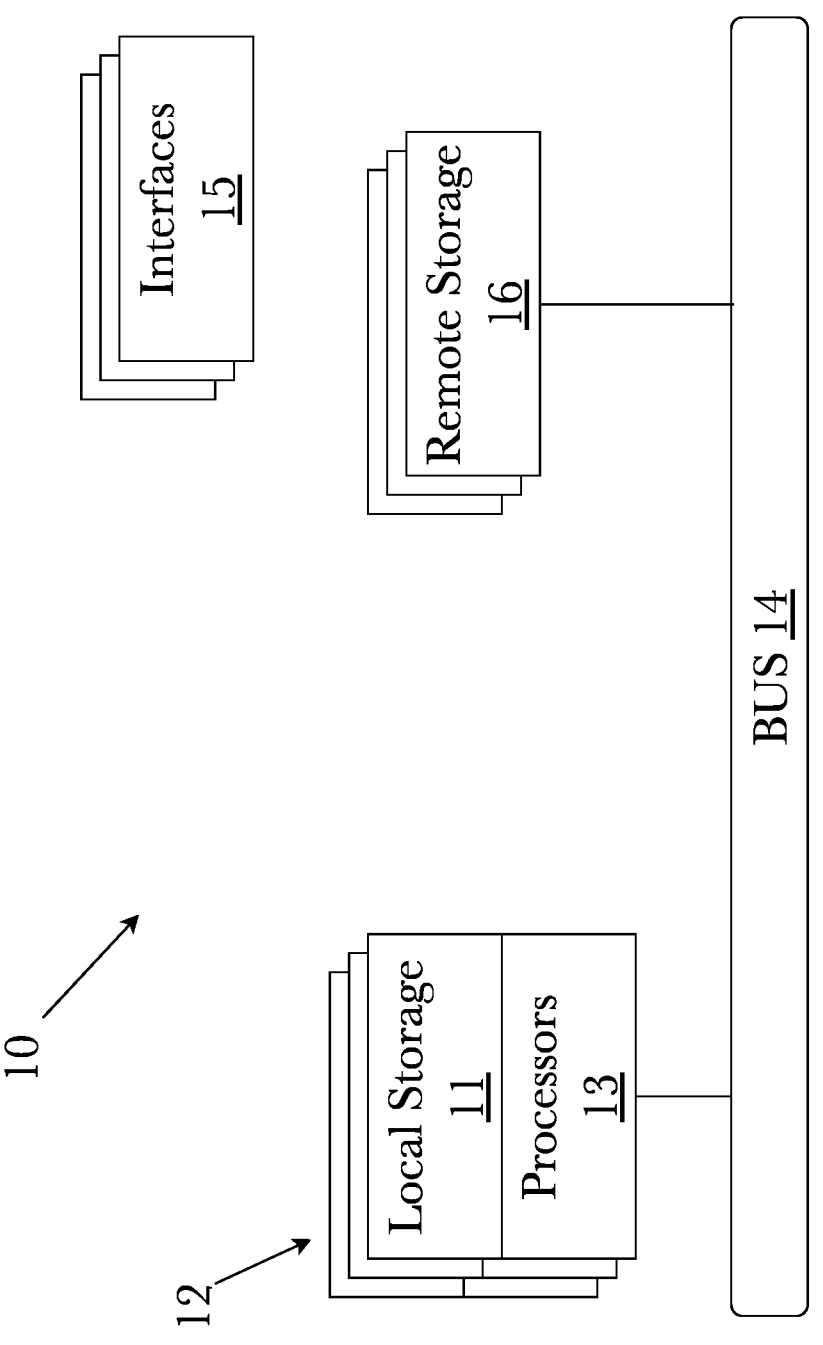
FIG. 16 is a block diagram illustrating an exemplary hardware architecture of a computing device.

Referring now to FIG. 16, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one aspect, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one aspect, a computing device 10 may be configured or designed to function as a server system utilizing CPU 12, local memory 11 and/or remote memory 16, and interface(s) 15. In at least one aspect, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some aspects, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a particular aspect, a local memory 11 (such as non-volatile random access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAP-DRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one aspect, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FD-DIs), and the like. Generally, such interfaces 15 may include physical ports appropriate for communication with appropriate media. In some cases, they may also include an independent processor (such as a dedicated audio or video processor, as is common in the art for high-fidelity AN hardware interfaces) and, in some instances, volatile and/or non-volatile memory (e.g., RAM).

Although the system shown in FIG. 16 illustrates one specific architecture for a computing device 10 for implementing one or more of the aspects described herein, it is by no means the only device architecture on which at least a portion of the features and techniques described herein may be implemented. For example, architectures having one or any number of processors 13 may be used, and such processors 13 may be present in a single device or distributed among any number of devices. In one aspect, a single processor 13 handles communications as well as routing computations, while in other aspects a separate dedicated communications processor may be provided. In various aspects, different types of features or functionalities may be implemented in a system according to the aspect that includes a client device (such as a tablet device or smartphone running client software) and server systems (such as a server system described in more detail below).

Regardless of network device configuration, the system of an aspect may employ one or more memories or memory modules (such as, for example, remote memory block 16 and local memory 11) configured to store data, program instructions for the general-purpose network operations, or other information relating to the functionality of the aspects described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device aspects may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 17:
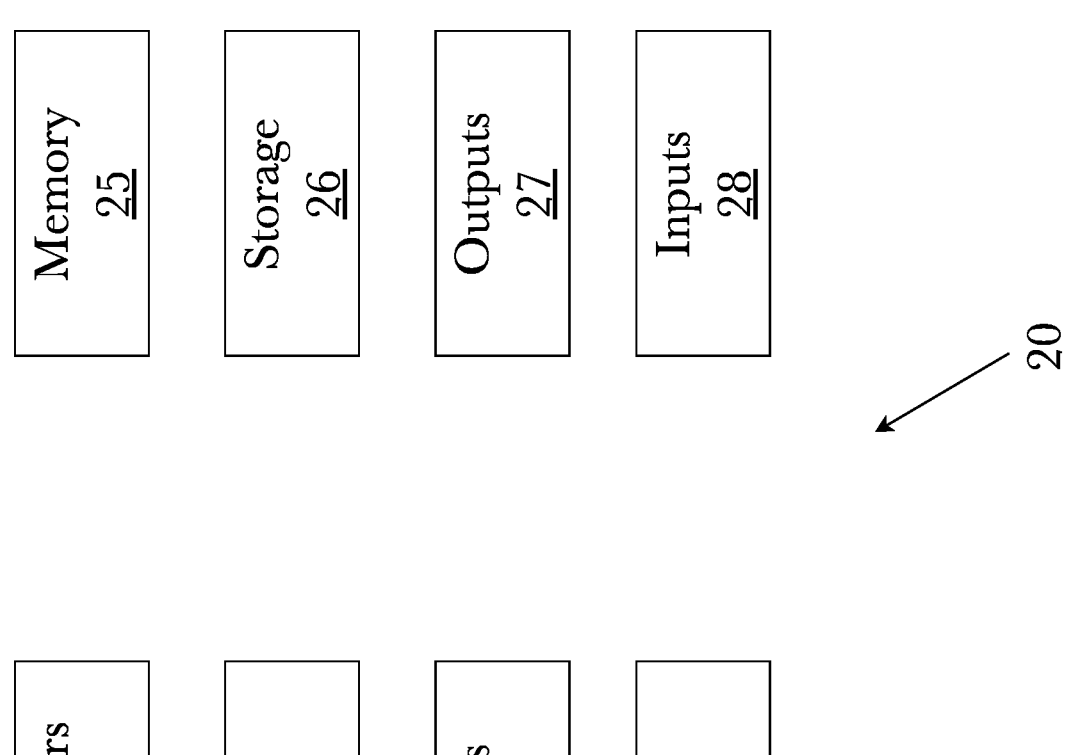
FIG. 17 is a block diagram illustrating an exemplary logical architecture for a client device.

In some aspects, systems may be implemented on a standalone computing system. Referring now to FIG. 17, there is shown a block diagram depicting a typical exemplary architecture of one or more aspects or components thereof on a standalone computing system. Computing device 20 includes processors 21 that may run software that carry out one or more functions or applications of aspects, such as for example a client application 24. Processors 21 may carry out computing instructions under control of an operating system 22 such as, for example, a version of MICROSOFT WINDOWS™ operating system, APPLE macOS™ or iOS™ operating systems, some variety of the Linux operating system, ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 16). Examples of storage devices 26 include flash memory, magnetic hard drive, CD-ROM, and/or the like.

Figure 18:
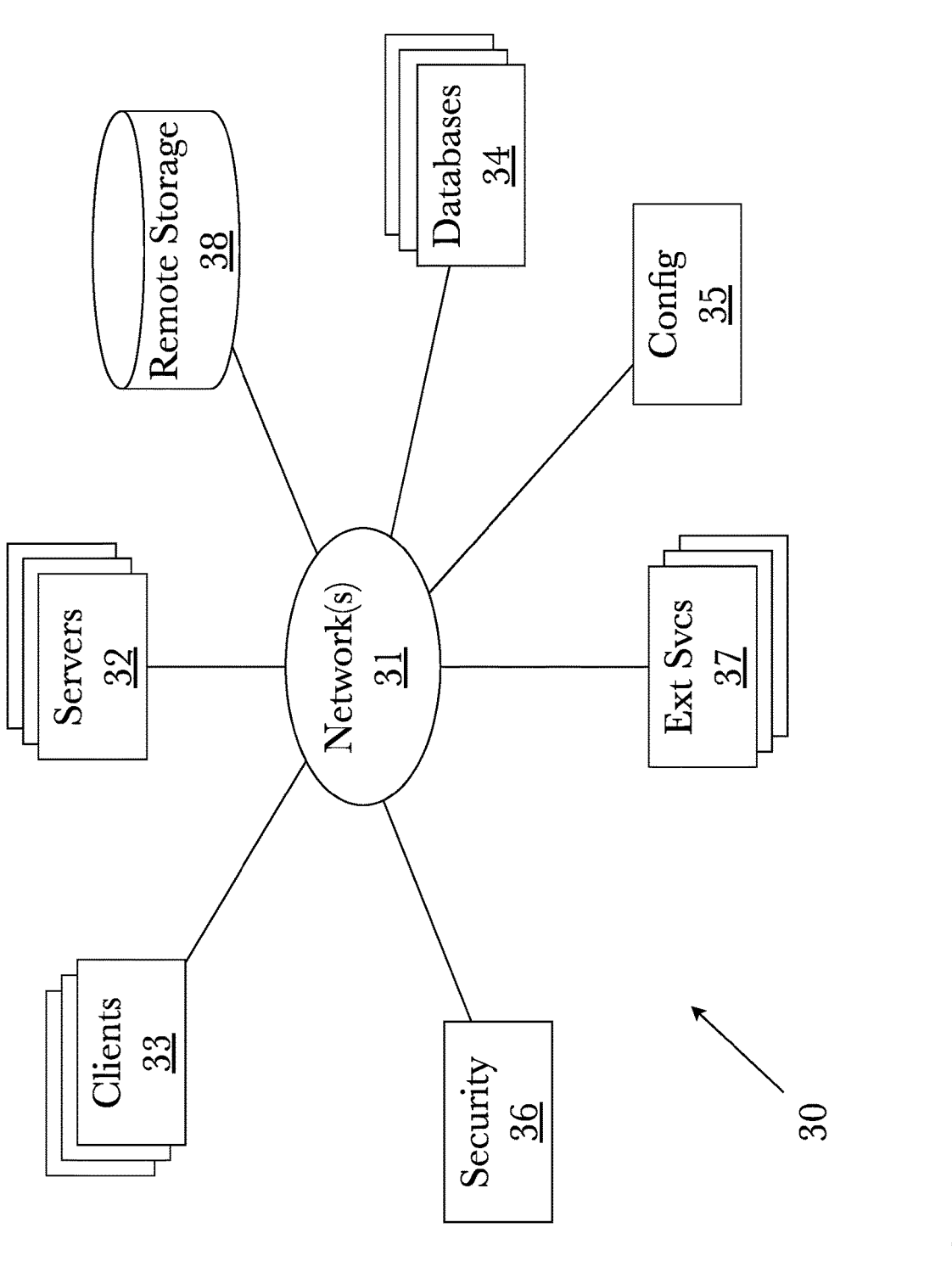
FIG. 18 is a block diagram showing an exemplary architectural arrangement of clients, servers, and external services.
Figure 19:
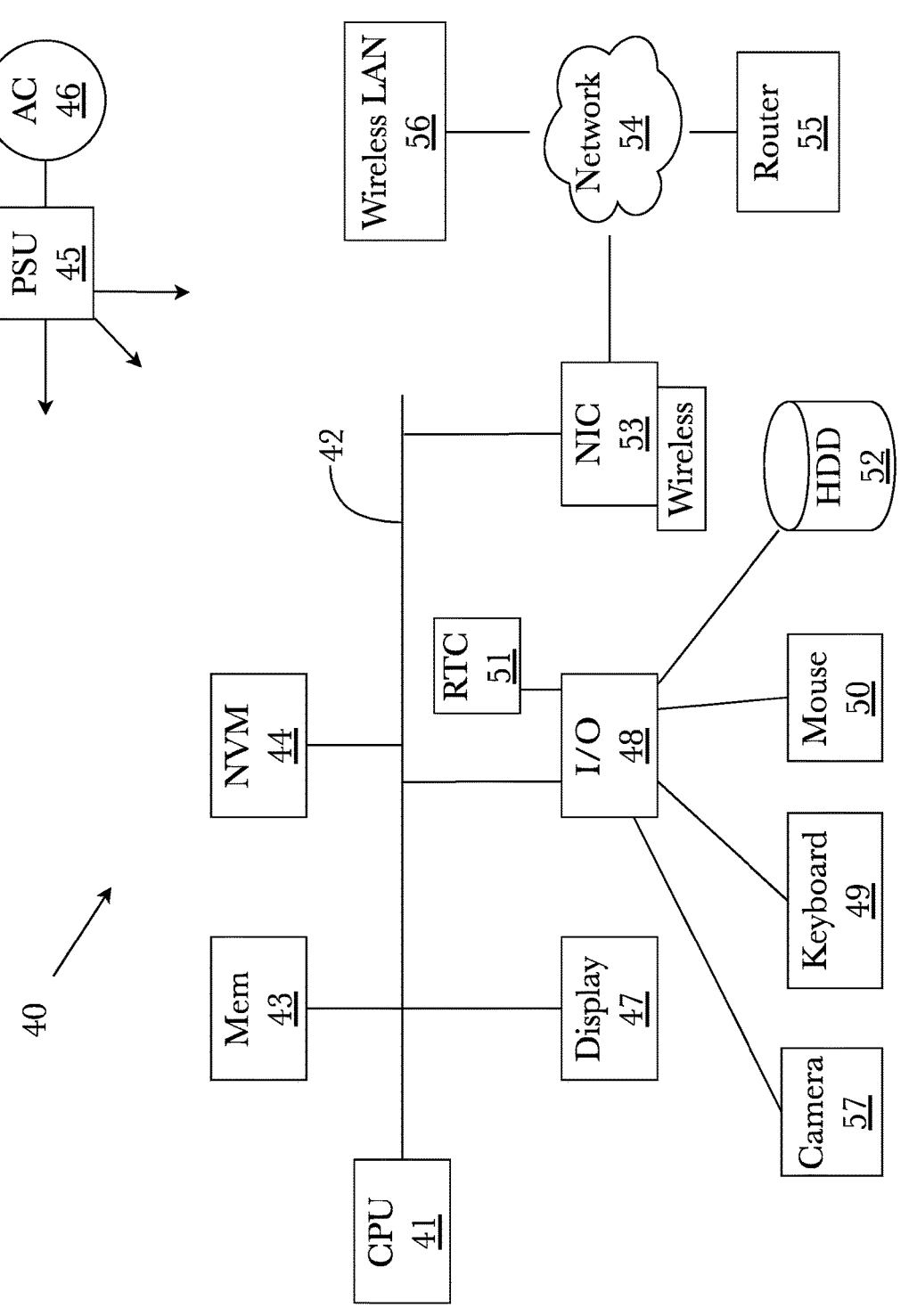
FIG. 19 is another block diagram illustrating an exemplary hardware architecture of a computing device.

In some aspects, systems may be implemented on a distributed computing network, such as one having any number of clients and/or servers. Referring now to FIG. 18, there is shown a block diagram depicting an exemplary architecture 30 for implementing at least a portion of a system according to one aspect on a distributed computing network. According to the aspect, any number of clients 33 may be provided. Each client 33 may run software for implementing client-side portions of a system; clients may comprise a system 20 such as that illustrated in FIG. 17. In addition, any number of servers 32 may be provided for handling requests received from one or more clients 33. Clients 33 and servers 32 may communicate with one another via one or more electronic networks 31, which may be in various aspects any of the Internet, a wide area network, a mobile telephony network (such as CDMA or GSM cellular networks), a wireless network (such as WiFi, WiMAX, LTE, and so forth), or a local area network (or indeed any network topology known in the art; the aspect does not prefer any one network topology over any other).

Networks 31 may be implemented using any known network protocols, including for example wired and/or wireless protocols.

In addition, in some aspects, servers 32 may call external services 37 when needed to obtain additional information, or to refer to additional data concerning a particular call. Communications with external services 37 may take place, for example, via one or more networks 31. In various aspects, external services 37 may comprise web-enabled services or functionality related to or installed on the hardware device itself. For example, in one aspect where client applications 24 are implemented on a smartphone or other electronic device, client applications 24 may obtain information stored in a server system 32 in the cloud or on an external service 37 deployed on one or more of a particular enterprise's or user's premises. In addition to local storage on servers 32, remote storage 38 may be accessible through the network(s) 31.

In some aspects, clients 33 or servers 32 (or both) may make use of one or more specialized services or appliances that may be deployed locally or remotely across one or more networks 31. For example, one or more databases 34 in either local or remote storage 38 may be used or referred to by one or more aspects. It should be understood by one having ordinary skill in the art that databases in storage 34 may be arranged in a wide variety of architectures and using a wide variety of data access and manipulation means. For example, in various aspects one or more databases in storage 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some aspects, variant database architectures such as column-oriented databases, in-memory databases, clustered databases, distributed databases, or even flat file data repositories may be used according to the aspect. It will be appreciated by one having ordinary skill in the art that any combination of known or future database technologies may be used as appropriate, unless a specific database technology or a specific arrangement of components is specified for a particular aspect described herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, some aspects may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with aspects without limitation, unless a specific security 36 or configuration system 35 or approach is specifically required by the description of any specific aspect.

FIG. 17 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to peripherals such as a keyboard 49, pointing device 50, hard disk 52, real-time clock 51, a camera 57, and other peripheral devices. NIC 53 connects to network 54, which may be the Internet or a local network, which local network may or may not have connections to the Internet. The system may be connected to other computing devices through the network via a router 55, wireless local area network 56, or any other network connection. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various aspects, functionality for implementing systems or methods of various aspects may be distributed among any number of client and/or server components. For example, various software modules may be implemented for performing various functions in connection with the system of any particular aspect, and such modules may be variously implemented to run on server and/or client components.

The skilled person will be aware of a range of possible modifications of the various aspects described above. Accordingly, the present invention is defined by the claims and their equivalents.

What is claimed is:

1. A system for holistic network cybersecurity evaluation and rating, comprising:

a first computing device comprising a memory and a processor;

a reconnaissance engine comprising a first plurality of programming instructions stored in the memory of, and operating on the processor of, the first computing device, wherein the first plurality of programming instructions, when operating on the processor, cause the first computing device to:

capture system information and characteristics about a target network comprising a plurality of computing devices; and use the captured system information and characteristics to create a network definition of the target network, the network definition being in the form of a graph representation of the target network, wherein nodes of the graph represent hardware or computing devices, and edges between nodes represent physical and logical connections between and among the hardware or computing devices;

a hardware emulator comprising a second plurality of programming instructions stored in the memory of, and operating on the processor of, the first computing device, wherein the second plurality of programming instructions, when operating on the processor, cause the first computing device to:

emulate functioning of the target network on the first computing device by:

executing a set of functions that emulate the operation of the target network as defined by hardware definitions and the network definition;

installing operating systems on emulated computing devices of the target network;

installing applications on emulated computing devices of the target network; and executing the applications on the emulated computing device using the operating systems; and analyze the functioning of the target network by executing an attack on the emulated target network associated with a known hardware exploit to:

determine whether the emulated target network is susceptible to the known hardware exploit;

update a network cybersecurity score using the determination; and send the updated network cybersecurity score to a scoring engine; and the scoring engine comprising a third plurality of programming instructions stored in the memory of, and operating on the processor of, the first computing device, wherein the third plurality of programming instructions, when operating on the processor, cause the first computing device to:

generate a cybersecurity score for the target network based on a combination of a software cybersecurity score, the hardware cybersecurity score, an operating system cybersecurity score, and the network cybersecurity score; and update the cybersecurity score for the target network with the updated network cybersecurity score.

2. The system of claim 1, further comprising a system analyzer that receives a software definition comprising source code for an application, wherein the software definition is accompanied by source code for the application, and wherein the software cybersecurity score further comprises an analysis of coding complexity of the source code.

3. The system of claim 1, further comprising a system analyzer comprising a fourth plurality of programming instructions stored in the memory of, and operating on the processor of, the first computing device, wherein the fourth plurality of programming instructions, when operating on the processor, causes the first computing device to:

receive a system definition comprising:

a software definition comprising executable binary code for the application; and an operating system definition for the target network, the operating system definition comprising executable binary code for the operating system;

identify a software function defined by the software definition and compare the software function to a database of software functions to establish the software cybersecurity score;

identify a hardware component defined by the hardware definition and compare the component to a database of components to establish the hardware cybersecurity score; and identify an operating system function defined by the operating system definition and compare the operating system function to a database of operating system functions to establish the operating system cybersecurity score.

4. The system of claim 1, wherein the hardware definition comprises at least one or more memory maps, wherein the one or more memory maps associate hardware components of a physical hardware system and memory locations of the emulated computing devices of the target network.

5. The system of claim 1, wherein the first computing device is a cloud-based computing device external to the target network.

6. The system of claim 1, wherein a set of clones of the emulated computing devices of the target network are created and tools are injected in each clone for testing.

7. The system of claim 1, wherein the scoring engine is further configured to:

correlate cybersecurity signals received from multiple tools across a unified security platform including endpoint protection, identity management, data loss prevention, and threat analytics tools; and adjust the cybersecurity score for the target network based on aggregated signal intelligence and risk profiles derived from over a threshold quantity of daily threat indicators.

8. A method for holistic network cybersecurity evaluation and rating, comprising the steps of:

capturing system information and characteristics about a target network comprising a plurality of computing devices;

using the captured system information and characteristics to create a network definition of the target network, the network definition being in the form of a graph representation of the target network, wherein nodes of the graph represent hardware or computing devices, and edges between nodes represent physical and logical connections between and among the hardware or computing devices:

emulating functioning of the target network on a first computing device by:

executing a set of functions that emulate the operation of the target network as defined by a hardware definition and the network definition;

installing operating systems on the emulated computing devices of the target network;

installing applications on the emulated computing devices of the target network; and executing the applications on the emulated computing devices using the operating systems; and analyzing the functioning of the target network by executing an attack on the emulated target network associated with a known hardware exploit to:

determine whether the emulated target network is susceptible to the known hardware exploit; and update a network cybersecurity score using the determination;

generating a cybersecurity score for the target network based on a combination of a software cybersecurity score, a hardware cybersecurity score, an operating system cybersecurity score, and a network cybersecurity score; and updating the cybersecurity score for the target network using the updated network cybersecurity score.

9. The method of claim 8, wherein the software definition is accompanied by source code for the application, and wherein the software cybersecurity score further comprises an analysis of the coding complexity of the source code.

10. The method of claim 8, further comprising the steps of:

receiving a system definition comprising:

a software definition comprising executable binary code for the application;

the hardware definition comprising a specification for the target network; and an operating system definition for the target network, the operating system definition comprising executable binary code for the operating system;

identifying a software function defined by the software definition and comparing the function to a database of software functions to establish the software cybersecurity score;

identifying a hardware component defined by the hardware definition and comparing the component to a database of components to establish the hardware cybersecurity score; and identifying an operating system function defined by the operating system definition and comparing the function to a database of operating system functions to establish the operating system cybersecurity score.

11. The method of claim 8, wherein the hardware definition comprises at least one or more memory maps, wherein the one or more memory maps associate hardware components of a physical hardware system and memory locations of the emulated computing devices of the target network.

12. The method of claim 8, wherein the first computing device is a cloud-based computing device external to the target network.

13. The method of claim 8, wherein a set of clones of the emulated computing devices of the target network are created and tools are injected in each clone for testing.

14. The method of claim 8, further comprising the steps of:

receiving a plurality of cybersecurity threat signals from identity management systems, endpoint monitoring tools, and data protection systems;

generating a composite risk signal from the plurality of cybersecurity threat signals; and adjusting the cybersecurity score of the target network based on the composite risk signal.

* * * * *